US012482324B2

United States Patent

Connelly et al.

(12) United States Patent
(10) Patent No.: US 12,482,324 B2
(45) Date of Patent: Nov. 25, 2025

(54) COMPUTER-IMPLEMENTED SYSTEMS AND METHODS FOR CUTSCENE MANAGEMENT IN ELECTRONICALLY DISPLAYED GAMES

(71) Applicant: POARCH BAND OF CREEK INDIANS, Atmore, AL (US)

(72) Inventors: Peter A. Connelly, Seattle, WA (US); James F. Dorris, Jr., Spanish FOrt, AL (US); Kenneth William Rohman, III, Gulf Shores, AL (US); Brian Franklin Bell, Walnut Hill, FL (US); Peter Anderson, Northbrook, IL (US); Ronald E. Nesbitt, Montgomery, AL (US); Jessica Hadley, Bay Minette, AL (US)

(73) Assignee: Poarch Band of Creek Indians, Atmore, AL (US)

(*) Notice: Subject to any disclaimer, the term of this patent is extended or adjusted under 35 U.S.C. 154(b) by 267 days.

(21) Appl. No.: 17/823,452

(22) Filed: Aug. 30, 2022

(65) Prior Publication Data

US 2023/0080406 A1 Mar. 16, 2023

Related U.S. Application Data

(60) Provisional application No. 63/239,216, filed on Aug. 31, 2021.

(51) Int. Cl.
*G07F 17/32* (2006.01)

(52) U.S. Cl.
CPC ...... *G07F 17/3213* (2013.01); *G07F 17/3267* (2013.01); *G07F 17/3276* (2013.01)

(58) Field of Classification Search
CPC ............. G07F 17/3213; G07F 17/3267; G07F 17/3276
See application file for complete search history.

(56) References Cited

U.S. PATENT DOCUMENTS 4,672,541 A * 6/1987 Bromley .............. A63F 13/537 463/31
5,607,356 A * 3/1997 Schwartz ............... A63F 13/45 463/31

(Continued)

OTHER PUBLICATIONS

International Search Report and Written Opinion mailed Dec. 6, 2022, in International Application No. PCT/US2022/075710 (14 pages).

*Primary Examiner* — Malina D. Blaise
(74) *Attorney, Agent, or Firm* — Finnegan, Henderson, Farabow, Garrett & Dunner, LLP

(57) ABSTRACT

A computer-implemented method is provided for cutscene management. The method is implemented with at least one processor and includes receiving, from a game server, game state data representing a state of an electronically displayed game, the game being hosted by a plurality of gameplay client devices that are configured to transmit the game state data to the game server. The method also includes determining an event associated with the game based on the game state data, determining at least one cutscene based on the event, the at least one cutscene including a visual representation of the event, and inserting the at least one cutscene into a cutscene queue, the cutscene queue including at least one cutscene associated with the game and a sequence for displaying the at least one cutscene from the cutscene queue.

37 Claims, 13 Drawing Sheets

(56) References Cited

U.S. PATENT DOCUMENTS

| | | | | |
|---|---|---|---|---|
| 6,527,637 | B2 * | 3/2003 | Fujioka | G09G 5/377<br>463/31 |
| 7,033,269 | B2 * | 4/2006 | Namba | A63F 13/10<br>463/3 |
| 10,062,208 | B2 * | 8/2018 | Ziman | G06F 3/147 |
| 11,071,919 | B2 * | 7/2021 | Willette | A63F 13/85 |
| 2018/0161675 | A1 * | 6/2018 | Miron | A63F 13/822 |
| 2019/0250773 | A1 * | 8/2019 | Miyaki | G06F 3/04815 |
| 2020/0030697 | A1 * | 1/2020 | Mueller | A63F 13/352 |
| 2020/0365188 | A1 * | 11/2020 | Brinkman, Jr. | H04N 21/472 |
| 2020/0368616 | A1 * | 11/2020 | Delamont | H04N 13/239 |

* cited by examiner

700

800

COMPUTER-IMPLEMENTED SYSTEMS AND METHODS FOR CUTSCENE MANAGEMENT IN ELECTRONICALLY DISPLAYED GAMES

CROSS REFERENCE TO RELATED APPLICATION(S)

This application claims priority to U.S. Provisional Application No. 63/239,216, filed Aug. 31, 2021, the contents of which is hereby incorporated by reference in its entirety.

TECHNICAL FIELD

The present disclosure generally relates to fields of data processing and computing, and computer-implemented gaming systems, methods, and machines. More particularly, and without limitation, the present disclosure relates to computer-implemented systems and methods for cutscene management in, for example, electronically displayed games. Such games may include video displays of activity and sequences in a game played by one or more players.

BACKGROUND

Electronic gaming machines are known that allow users to play individually or against each other in limited and highly configured groups. These gaming machines include a number of components (hardware, software, and/or firmware) to enable users to participate in games. The gaming machines may be provided at a physical location, such as a casino or other building where regulated gaming is permitted, or online gaming may be implemented where the games are hosted on a website and/or supported by one or more servers. Regulated gaming machines often have restrictions in terms of the rules and payout of the enabled games. There are also technological restrictions such as limited game type(s) enabled per gaming machine and the inability to allow players of different underlying games to participate in secondary game(s). Online gaming is also available, but there can be restrictions placed on websites that host online games, and in some jurisdictions, there are regulations that prohibit online bets or wagers.

Tournament-style games exist both online and in casinos. Typically, in a regulated gaming environment (e.g., a casino), an operator or administrator may select the underlying game for the tournament. For example, the underlying or secondary game may be a racing game or other games different from a primary game (e.g., a slot game). The underlying game may have sequential progressive events (e.g., real-time ranking or status changes of players). Observers in the gaming environment may observe and be entertained by the presentation of such sequential progressive events, in-game highlights, and final results.

However, extant gaming systems suffer from numerous drawbacks which limit or prevent them from providing a full and well-synchronized gameplay experience. For example, extant systems have limited or ineffective management of game state information and event coordination among multiple gaming machines and/or spectators viewing a game. This is compounded where there are multiple games being played and the state in one game influences the game state or progression in another game. Moreover, gaming machines and systems can missequence events or fail to remove outdated events and properly update scenes in gaming displays, including for networked clients and online terminals. Still further, there are technical challenges with generating a spectator view to a game played by players on other gaming machines.

SUMMARY

Consistent with embodiments of the present disclosure, systems, methods, and non-transitory computer-readable media are provided for cutscene management in electronically displayed games. The embodiments may be implemented with different types of electronic games, including those that include video displays of activity and sequences in a game played by one or more players. As further disclosed herein, embodiments of the present disclosure overcome the drawbacks and technical limitations of extant systems. For example, implementations of the present disclosure provide more complete and better synchronized gameplay experience for users. Embodiments of the present disclosure provide, among other technical features, effective game state management and distribution of state information. Event coordination is also improved among multiple gaming machines and/or spectator client devices viewing a game. Furthermore, embodiments of the present disclosure properly sequence events and remove outdated events, while more effectively providing updated scenes in gaming displays, including for networked clients and online terminals.

In some embodiments of this disclosure, a computer-implemented gaming system is disclosed. The computer-implemented gaming system includes a plurality of gameplay client devices communicatively coupled to a game server, each gameplay client device includes at least one processor configured to host an electronically displayed game and transmit game state data representing a state of the game to the game server. The game server may be configured to further transmit the game state data. In addition, the system may include at least one spectacle client device communicatively coupled to the game server and including at least one processor configured to: receive the game state data representing a state of the game from the game server; determine an event associated with the game based on the game state data; determine at least one cutscene associated with the game based on the event, the at least one cutscene including a visual representation of the event; insert the at least one cutscene into a cutscene queue, the cutscene queue including the at least one cutscene associated with the game and a sequence for displaying the at least one cutscene; and display the at least one cutscene from the cutscene queue.

In further embodiments of this disclosure, a computer-implemented gaming system is disclosed. The computer-implemented gaming system includes a plurality of electronic gaming machines, each electronic gaming machine being configured to host a primary game and transmit first game state data representing a state of the primary game. The system may further include a game server communicatively coupled to the plurality of electronic gaming machines and configured to receive the first game state data from the plurality of electronic gaming machines and further transmit the first game state data. The system may also include a gameplay client device communicatively coupled to the game server and including at least one processor configured to: receive the first game state data from the game server and host a secondary game based on the first game state data, the secondary game being different from the primary game; and transmit second game state data representing a state of the secondary game to the game server. The game server may be configured to further transmit the second game state data. In addition, the system may include a spectacle client device communicatively coupled to the game server and including at least one processor configured to: receive the second game state data representing a state of the secondary game from the game server; determine an event associated with the secondary game based on the second game state data; determine at least one cutscene associated with the secondary game based on the event, the at least one cutscene including a visual representation of the event; insert the at least one cutscene into a cutscene queue, the cutscene queue including the at least one cutscene associated with the secondary game and a sequence for displaying the at least one cutscene; and display the at least one cutscene.

In still further embodiments of the present disclosure, a computer-implemented method for cutscene management is provided. The method may be implemented with at least one processor that is configured to perform the following steps. receiving, from a game server, game state data representing a state of an electronically displayed game, the game being played on a plurality of gameplay client devices; determining a context associated with the game based on the game state data, the context including at least one of an event or a biome; determining at least one cutscene based on the context, the at least one cutscene including a visual representation of the game; inserting the at least one cutscene into a cutscene queue, the cutscene queue comprising at least one cutscene associated with the game and a sequence for displaying the at least one cutscene; and controlling a display of the at least one cutscene from the cutscene queue.

In yet further embodiments of the present disclosure, a computer-implemented method for cutscene management is provided. The method may be implemented with at least one processor and include receiving first game state data representing a state of a primary game from a plurality of electronic gaming machines, each electronic gaming machine being configured to host the primary game; transmitting the first game state data to a gameplay client device, the gameplay client device configured to host a secondary game based on the first game state data, the secondary game being different from the primary game. Further, the method includes receiving, from the gameplay client device, second game state data representing a state of the secondary game, and transmitting the second game state date to a spectacle client device, the spectacle client device being configured for displaying a cutscene.

Additional features and aspects may be provided. For example, the method for cutscene management may further include determining at least one of an event or biome in the secondary game based on the second game state data, and determining the cutscene for display based on the determined at least one event or biome. Further, the gameplay client device may be a first gameplay client device, and the method may also include transmitting the first game state data to a second gameplay client device, the second gameplay client device configured to host the secondary game based on the first game state data. As a further example, the first game state data may include data representing at least one of a score associated with a player in the primary game, a result associated with the player in the primary game, a rank associated with the player in the primary game, a progression associated with the player in the primary game, a position associated with the player in the primary game, a status associated with the player in the primary game, or a game result history associated with the player in the primary game. As a still further example, the second game state data may include data representing at least one of a score associated with a player in the secondary game, a result associated with the player in the secondary game, a rank associated with the player in the secondary game, a progression associated with the player in the secondary game, a position associated with the player in the secondary game, a status associated with the player in the secondary game, or a game result history associated with the player in the secondary game.

Methods for cutscene management, as disclosed herein, may further include receiving message data from the spectacle client device, the message data including at least one of a request for game state update or identification data of the spectacle client device.

In yet other embodiments of the present disclosure, another computer-implemented method for cutscene management is provided. The method may be implemented with at least one processor and include receiving, from a game server, second game state data representing a state of a secondary game, the secondary game being hosted by a gameplay client device based on first game state data representing a state of a primary game, the secondary game being different from the primary game; determining an event associated with the secondary game based on the second game state data; and determining at least one cutscene based on the event, the at least one cutscene including a visual representation of the event. The method also includes inserting the at least one cutscene into a cutscene queue, the cutscene queue including at least one cutscene associated with the secondary game and a sequence for displaying the at least one cutscene; and controlling a display of the at least one cutscene.

In accordance with other embodiments, a system for cutscene management is provided, the system includes a spectacle client device, including at least one processor configured to: receive game state data representing a state of an electronically displayed game from a game server; determine a context associated with the game based on the game state data, the context including at least one of an event or a biome; determine at least one cutscene associated with the game based on the determined context, the at least one cutscene including a visual representation of the game; insert the at least one cutscene into a cutscene queue, the cutscene queue comprising the at least one cutscene associated with the game and a sequence for displaying the at least one cutscene; and display the at least one cutscene.

Additional features and aspects may be provided. For example, in systems for cutscene management, the event may include at least one of initiation of the game, invitation to play the game, acceptance of invitation to play the game, generation of a player list of the game, a countdown to start the game, starting of the game, a game state change in the game, a game action by a player in the game, failure of a game action by a player in the game, a countdown to complete the game, or completion of the game. Also, the biome may include at least one of a location, an area, or an environment.

Systems for cutscene management may also include a plurality of gameplay client devices, each gameplay client device including at least one processor configured to host a game and transmit the game state data to the game server. The game may be a secondary game that depends on a state of a primary game. The system may also include a plurality of electronic gaming machines, each electronic gaming machine being configured to host the primary game and transmit first game state data representing a state of the primary game to the game server, wherein the game server is configured to further transmit the first game state data to the plurality of gameplay client devices.

According to aspects of the present disclosure, each gameplay client device may be configured to receive the first game state data from the game server, host the secondary game based on the first game state data, the secondary game being different from the primary game, and transmit secondary game state data representing a state of the secondary game to the game server, wherein the game server is configured to further transmit the second game state data to the spectacle client device. Further the game state data may include data representing at least one of a score associated with a player in the game, a result associated with the player in the game, a rank associated with the player in the game, a progression associated with the player in the game, a position associated with the player in the game, a status associated with the player in the game, or a game result history associated with the player in the game.

In systems for cutscene management, the at least one processor of the spectacle client device may be configured to: determine whether a difference exists between the game state data received from the game server and local game state data stored in the spectacle client; and based on a determination that the difference exists between the game state data received from the game server and the local game state data, update the local game state data using the game state data from the game server. Also, the at least one cutscene may be a first cutscene and the cutscene queue may further include a second cutscene. Additionally, in some embodiments, the at least one processor of the spectacle client device is further configured to: after displaying the first cutscene, remove the first cutscene from the cutscene queue; and display the second cutscene, wherein the second cutscene follows the first cutscene in the cutscene queue.

According to further aspects of the present disclosure, the at least one processor of the spectacle client device may be further configured to: determine a lifetime associated with the second cutscene, wherein the lifetime starts to time when the second cutscene is inserted into the cutscene queue; and in response to the lifetime lapsing before displaying the second cutscene, remove the second cutscene from the cutscene queue. Also, the at least one processor of the spectacle client device may be further configured to: in response to the cutscene queue being empty after displaying the at least one cutscene, display a random cutscene.

Still further, the at least one cutscene may be a first cutscene and the cutscene queue may further include a second cutscene, and the at least one processor of the spectacle client device may be further configured to: determine a transition event in the first cutscene; determine the second cutscene based on the transition event; and display the second cutscene. The transition event may represent at least one of a game action by a player in the game, failure of a game action by a player in the game, or a game state change associated with a player in the game.

The at least one processor of the spectacle client device may also be configured to: transmit message data to the game server, the message data including at least one of a request for game state update or identification data of the spectacle client device. Also, the at least one processor of the spectacle client device is further configured to: determine a cutscene type based on the context; and select the at least one cutscene from a list of predetermined cutscenes associated with the cutscene type. Still further, the at least one processor of the spectacle client device may be further configured to: determine a weight value associated with the context; and determine a position of the at least one cutscene in the cutscene queue based on the weight value. In addition, the at least one processor of the spectacle client device may be further configured to display a location associated with the cutscene type; and display an object in the location and a name associated with the object, wherein the cutscene comprises the location, the object, and the name.

Moreover, as disclosed herein, the at least one cutscene may be a first cutscene and the cutscene queue may include a second cutscene, and the at least one processor of the spectacle client device may be further configured to: determine a change of the location; determine a second cutscene based on the change of the location; and display the second cutscene. Also, the at least one processor of the spectacle client device is further configured to: determine a time duration for the at least one cutscene; and display the at least one cutscene for the time duration. Further, the at least one processor of the spectacle client device may be further configured to implement cutscene logic to maintain the cutscene sequence, and a cutscene manager communicatively coupled to the cutscene logic and configured to display the at least one cutscene.

Some aspects of systems for cutscene management include cutscene logic that is configured to generate an insertion request, the insertion request comprising one or more commands and data representing at least one of a cutscene type, a biome, a time duration of the cutscene being in the cutscene queue, a lifetime associated with the cutscene, a weight value associated with the cutscene, or event-specific information of the cutscene. Also, the cutscene manager may be further configured to receive the insertion request and display the at least one cutscene in accordance with the insertion request. Further, the cutscene manager may be configured to apply metadata for identifying options for displaying the at least one cutscene, the metadata comprising at least one of whether a cutscene option is selected and applied, a set of parameters of the cutscene, a list of locations allowing the cutscene to be displayed, a set of special effect parameters controlling the display of in-game players, a priority list of indices of players indicative of focuses in the at least one cutscene, or a set of parameters for setting up one or more cameras as perspectives of the cutscene.

Systems and methods consistent with the present disclosure may be implemented using any suitable combination of software, firmware, and hardware. Implementations of the present disclosure may include programs or instructions that are machine constructed and/or programmed specifically for performing functions associated with the disclosed operations or actions. Still further, non-transitory computer-readable storage media may be used that store program instructions, which are executable by at least one processor to perform the steps and/or methods described herein.

It will be understood that the foregoing description and the following detailed description are exemplary and explanatory only and are not restrictive of the disclosed embodiments.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
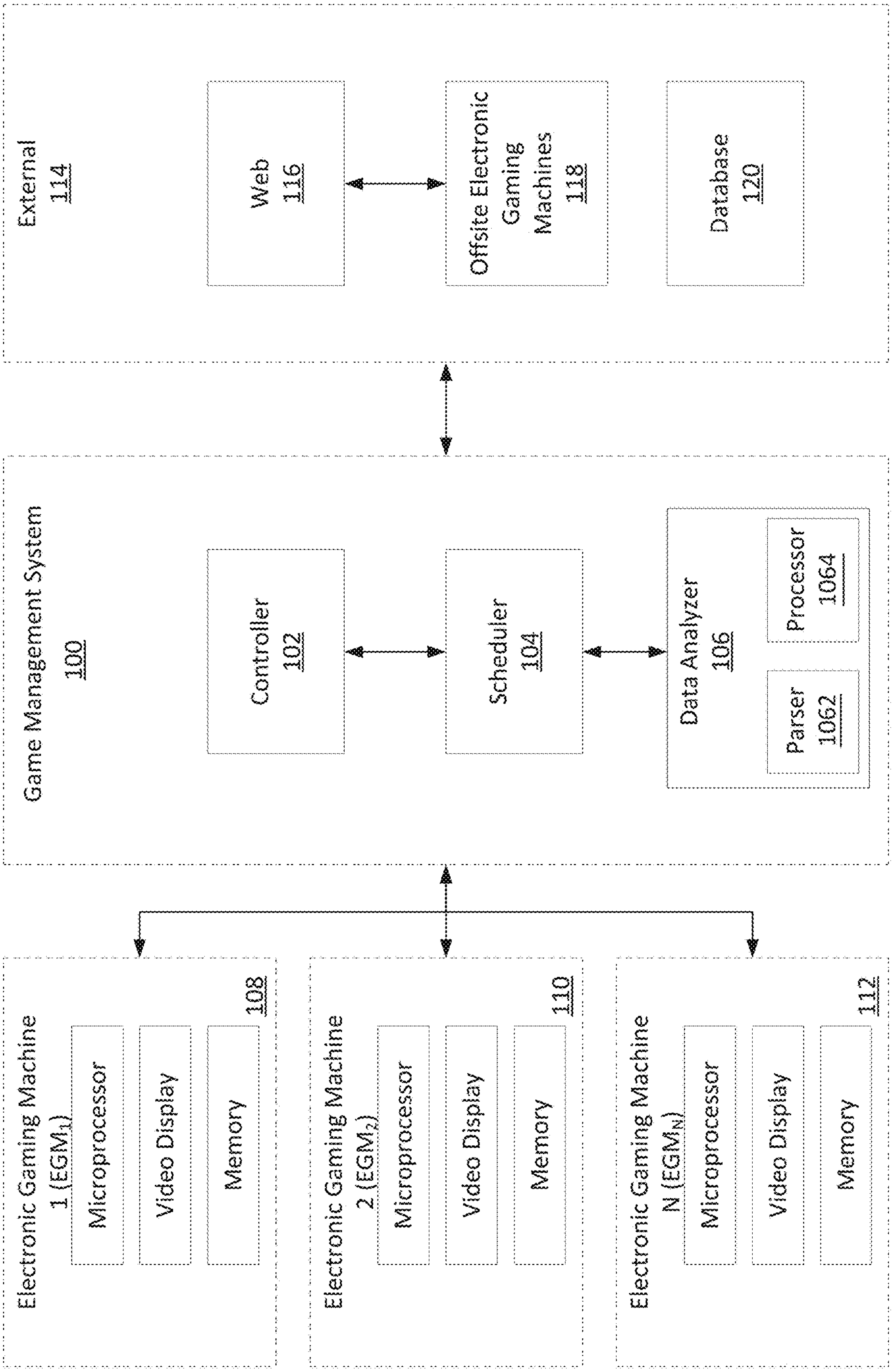
FIG. 1 illustrates an example system for electronic game creation and management, consistent with some embodiments of this disclosure.

Reference will now be made in detail to example embodiments which are described below and illustrated in the accompanying drawings. The following description refers to the accompanying drawings in which the same numbers in different drawings represent the same or similar elements unless otherwise represented. The implementations set forth in the following description do not represent all implementations consistent with the present disclosure. Instead, they are merely examples of apparatuses and methods consistent with aspects related to the invention as recited in the appended claims. Particular aspects of the present disclosure are described in greater detail below. The terms and definitions provided herein control, if in conflict with terms or definitions incorporated by reference.

An electronic gaming machine ("EGM," also referred to as a "gaming machine"), as used herein, includes any electronic device or apparatus for gaming. Examples of electronic gaming machines include but are not limited to electronic Class III slot machine games, electronic bingo machines, electronic racing machines, video poker machines, electronic table game machines, electronically augmented (e.g., virtual-reality or augmented-reality) table games, electronic sweepstakes machines, centrally determined and server-based game machines, client-based gaming devices or terminals (e.g., computers, laptops, smartphones, tablets, etc.), and any other electronically-aided game machine. In some implementations, the electronic gaming machines may accept wagers placed by specific players and generate the wagered outcomes for electronically displayed games where wagers are accepted and prizes are awarded. A player, as used herein, may refer to an individual who plays a game or group of individuals who collectively play a game. The game may be hosted and played on any electronic gaming machine, including a game console, a computer, a smartphone, a tablet, console, kiosk, or other type of gameplay device.

A primary game (also referred to as a "first game"), as used herein, refers to any game played by a player, the gameplay of which may be independent of any other game. By way of example, the primary game may include a slot game, a bingo game, a poker game, or any other type of game. A player at a gaming machine may select and play a primary game by pulling a lever, hitting a button, clicking a mouse, AR/VR input, eye or hand gestures, voice commands, or any other action.

A secondary game (also referred to as a "second game"), as used herein, refers to any game played by a player, the gameplay of which is dependent at least in part on game state data of a primary game. The game state data of a game (e.g., a primary game or a secondary game) may include, for example, data representing a game score, a game result, a score rank, a progression, a position of the player, a game status, a tournament rank, a game result history, or any other type of data representing a status, a result, or a game state change of the game. The secondary game may be different from or the same as the primary game. In some implementations, game state data of the secondary game (e.g., a progression, a movement, a speed of progression or movement, a position or arrangement of players, a game score, a level of achievement, or any in-game item or prop) may be determined or updated based on the game state data of the primary game. For example, the game state data of a player of a secondary game (e.g., a video game, a mobile game, or an online game) may be determined based on whether the player has won, partially won, or scored in a primary game (e.g., a slot game, a bingo game, or other type of primary game). In some embodiments, the game state data of the secondary game may be determined or updated based on a gameplay action of a player occurring in the primary game. By way of example, if a player is playing a slot game as a primary game, each time the player scores or reaches a result in the slot game, a determination of the progression, position, or score of the player in the secondary game may be determined based on the score or the achieved result in the slot game.

In some embodiments, different primary games may have different win rates, probabilities of winning, or scoring metrics. The secondary game may be managed and controlled to account for these differences so that different players may play different primary games yet compete fairly or relatively evenly in the secondary game. In some embodiments, the secondary game may be organized as part of a tournament or other types of game play, such as a multiplayer game. In the multiplayer game, one player may compete with one or more other players, or one team may compete with one or more other teams.

A cutscene, as used herein, includes a scene, a video, a movie clip, cinematic graphics, a sequence of pictures, or any visual representation of a game state or an in-game event. For example, the game state may include cars racing around a track in a multiplayer game. In another example, the in-game event may include race starting, race ending, or a car overtaking another. The cutscene may be interactive or non-interactive. For example, in an interactive cutscene, a game player may interact with one or more elements in the cutscene. Additionally, or optionally, one or more interaction or conversation options may be provided. In another example, in a non-interactive cutscene, the gameplayer may not interact with any element in the cutscene. In either case, the cutscene may present gameplay elements or objects in various views or perspectives (e.g., in a bird's view or a panning-camera view). For example, the cutscene may present gameplay elements in switching views of different participating players or in a perspective of none of the participating players. The cutscene may be electronically generated, rendered, or displayed, such as by computer graphics processor or hardware, in real-time or near real-time relative to gameplay or events. Additionally, or alternatively, the cutscene can also be pre-rendered, such as a clip of a video. In some embodiments, the cutscene may include further elements, such as, for example, static images, audio, texts, or panorama graphics. The cutscene may be displayed on a screen of a device, such as a computer monitor, a tablet or smartphone screen, a large display monitor.

Electronic gaming machines in a casino or other regulated location may involve players playing a number of different games on various gaming machines. The gaming machines may or may not be made by the same manufacturer. The players may be playing individual games or playing against each other while participating in the same game. The gaming machines may be implemented to play one or more game types (e.g., primary games and/or secondary games). In some scenarios, multiple players may play the same or different primary games in multiple different geo-locations and may play the same secondary game over a network.

By way of example, FIG. 1 is a diagram illustrating a system 100 for electronic game creation and management, consistent with some embodiments of this disclosure. The number and arrangement of components in FIG. 1 are for purposes of illustration and not intended to be limiting to the embodiments of this disclosure. Further, while the embodiment of FIG. 1 is described with reference to managing primary and secondary games, it will be appreciated that it may be similarly implemented to manage other electronic games. As shown, game management system 100 includes a controller 102, a scheduler 104, and a data analyzer 106. The game management system 100 is configured to connect and relay information between a plurality of electronic gaming machines (including electronic gaming machines 108, 110, and 112) for creating and managing electronic games, such as secondary games influenced at least in part on game state data of one or more primary games (e.g., primary games played on electronic gaming machines). Among other operations, the system 100 may be configured to display various aspects of a secondary game on the electronic gaming machine displays. Electronic gaming machines 108, 110, and 112 may be physically located in one or more casinos or another regulated environment. Electronic gaming machines 108, 110, and 112 may be computer-implemented equipment with a combination of hardware, software, or firmware components. Electronic gaming machines 108, 110, and 112 may also be provided in various forms (e.g., size, shape, and other specifications). By way of example, forms of electronic gaming machines 108, 110, and 112 may include a console, an upright station or monitor, a tabletop, a reel or a slot machine, a handheld device, or tablet computer. The components of electronic gaming machines 108, 110, and 112 may include, for instance, one or more of a monitor or display, a display monitor, a game controller or circuitry (including a processor, a memory, and program codes stored in the memory), a random number generator, a credit input or payment component, an interface processor, or a peripheral (e.g., a button, a key, or a light.

In some embodiments, the game management system 100 may be configured to receive, over a network connection, a data feed from each of the electronic gaming machines 108, 110, and 112. The data feed may include data messages through which elements of the player profile and game player data are provided. The data feed may be sent before, during or after a game finishes on the electronic gaming machines 108, 110, and 112 and may be used by the game management system 100 or stored on a server or a database for subsequent use by other applications. The data feed may be implemented using a game accounting tacking system supported by the electronic gaming machines 108, 110, and 112. With such game accounting tracking systems or similar tracking systems, the game management system 100 may be configured to receive a data feed, over a network connection, from electronic gaming machines 108, 110, and 112 made by any of a number of electronic gaming machine manufacturers. As further disclosed herein, the received data feed, including player profile information and game player data, may be used by controller 102, scheduler 104, and data analyzer 106 for purposes of electronic game creation and management.

In some embodiments, data analyzer 106 may receive data from a plurality of gaming machines (e.g., electronic gaming machines 108, 110, and 112). For example, the plurality of electronic gaming machines may be used for a primary game, a secondary game, or a combination thereof. The data received by data analyzer 106 may include any combination of primary game data or secondary game data. In some embodiments, data analyzer 106 may receive the data from electronic gaming machines equipped with different data tracking or collection systems (e.g., a system with data telemetry capability) or data formats. For example, in some embodiments, the data tracking systems may include a system with data telemetry capability. In some embodiments, data analyzer 106 may utilize a common protocol to merge, combine, re-format, or harmonize data received from different data tracking systems or having different data formats for data analysis.

As shown in FIG. 1, data analyzer 106 includes a parser 1062 for parsing received data and a processor 1064 for analyzing and processing the parsed data. In some embodiments, parser 1062 may receive and parse multiple types of received data. The received data may represent an identification of an electronic gaming machine or a player. For example, parser 1062 may receive and parse an identification (e.g., a serial number or a unique alphanumeric string) of an electronic game machine or a player. In some embodiments, the identification may be associated with a token card or player that is provided when logging in. In addition, parser 1062 may receive and parse event-type data. For example, event data may include data representing a log-in event, a log-out event, or a game-complete event. The log-in event (such as a "card-in" event) may represent that a player logs into an electronic gaming machine (e.g., by inserting an ID card into the electronic game machine or manually entering an ID). The log-out event (such as a "card-out" event) may represent that a player logs out of an electronic gaming machine (e.g., by pulling out an ID card from the electronic game machine or manually exiting a game or machine). The game-complete event may represent that a game has been completed. The completed game may be a primary game or a secondary game. The game-complete event may be represented by or associated with data indicating the amount of the wage or bet and the amount or outcome of the game.

In some embodiments, the outcome of the game (e.g., a primary game) may include data identifying the win amount or results for the completed game. Data parsed by parser 1062 may be analyzed and processed by processor 1064. For example, processor 1064 may process identification data to validate a player. One or more database(s) may be used by processor 1064 to look-up a player profile. Processor 1064 may also process parsed data from the received feeds to determine the progression, position of players, or scoring in a secondary game. As disclosed herein, a player's progression, position, or scoring in a secondary game may be dependent on the scoring of outcome of their gameplay in a primary game. It may also be dependent on secondary gameplay and outcomes.

By way of example, the player's win amount in a primary game may be multiplied by a predetermined score multiplier to determine the player's progression, position, or scoring in the secondary game. In some secondary games, players of the secondary game may need to complete numerous rounds in one or more primary games before a final score or winner in a secondary game is determined. Examples of secondary games in which players progress or advance based on numerous rounds of gameplay in a primary game include track or race-style games. In a track or race game, players may compete against one another with vehicles or avatars that race and move along a track. All players may have preset base speed and the progression or position of a player's vehicle or avatar may advance based on their gameplay and outcomes in a primary game (e.g., bingo or slots). In some embodiments, a player's vehicle or avatar may increase in speed or position along the track in the secondary game based on the points, scores, or results achieved in the primary game. Higher points, scores, or results in the primary game may provide higher speeds or positions in the secondary game.

The relationship between the primary game results and the progression, position, or score in the secondary game may be determined by data analyzer 106. For example, the data analyzer may process the gameplay data and apply an algorithm that defines a linear or progressive relationship or may incorporate a multiplier to convert a player's points, scores, or results in a primary game into data for determining the progression, position, or score of the player in a secondary game. The ultimate winner of the secondary game may be determined by the data analyzer based on the player that first reaches the finish line or a predetermined score or level of play. It will be appreciated from this disclosure that other types of secondary games may be implemented that are based on the points, scores, or results in one or more primary games.

Still referring to FIG. 1, processor 1064 may also analyze and process other parsed data. For example, a bonus round event may be used to influence gameplay in the secondary game, such as giving a boost to player progression. As a further example, card-in and card-out events may be used to designate, substitute, or modify players to a secondary game. The above examples are non-limiting examples and it will be appreciated that other parsed data may be analyzed and processed by processor 1064 to manage the secondary game.

In some embodiments, the game management system 100 may also be connected via a network for communication with one or more external devices 114. For example, the game management system 100 may be connected to the web 116 (i.e., the Internet) for the purpose of displaying information from one or more websites on the electronic gaming machines 108, 110, and 112. The game management system 100 may also receive information from one or more websites (e.g., websites accessible via web 116 and implemented with one or more servers) for creating and managing a secondary game. Further, the game management system 100 may be configured to send information about the secondary game to a website for display, such as scores or a livestream of the game feed for a tournament or other form of multiplayer game type, such as team against team. In some embodiments, the game management system 100 may be configured to send and receive information associated with a secondary game from a database 120.

In some embodiments, the game management system 100 may be connected, via a network, to one or more offsite electronic gaming machines 118. For example, the game management system 100 may be configured to send and receive information from one or more offsite electronic gaming machines 118 participating in the secondary game. Offsite electronic gaming machines 118 may include electronic gaming machines that are in different areas of a single casino or may include electronic gaming machines located in multiple different casinos. Additionally, offsite electronic gaming machines 118 may include electronic gaming machines that are not located in a casino, such as in another physical location or one or more mobile or online gaming machines, for example.

Figure 2:
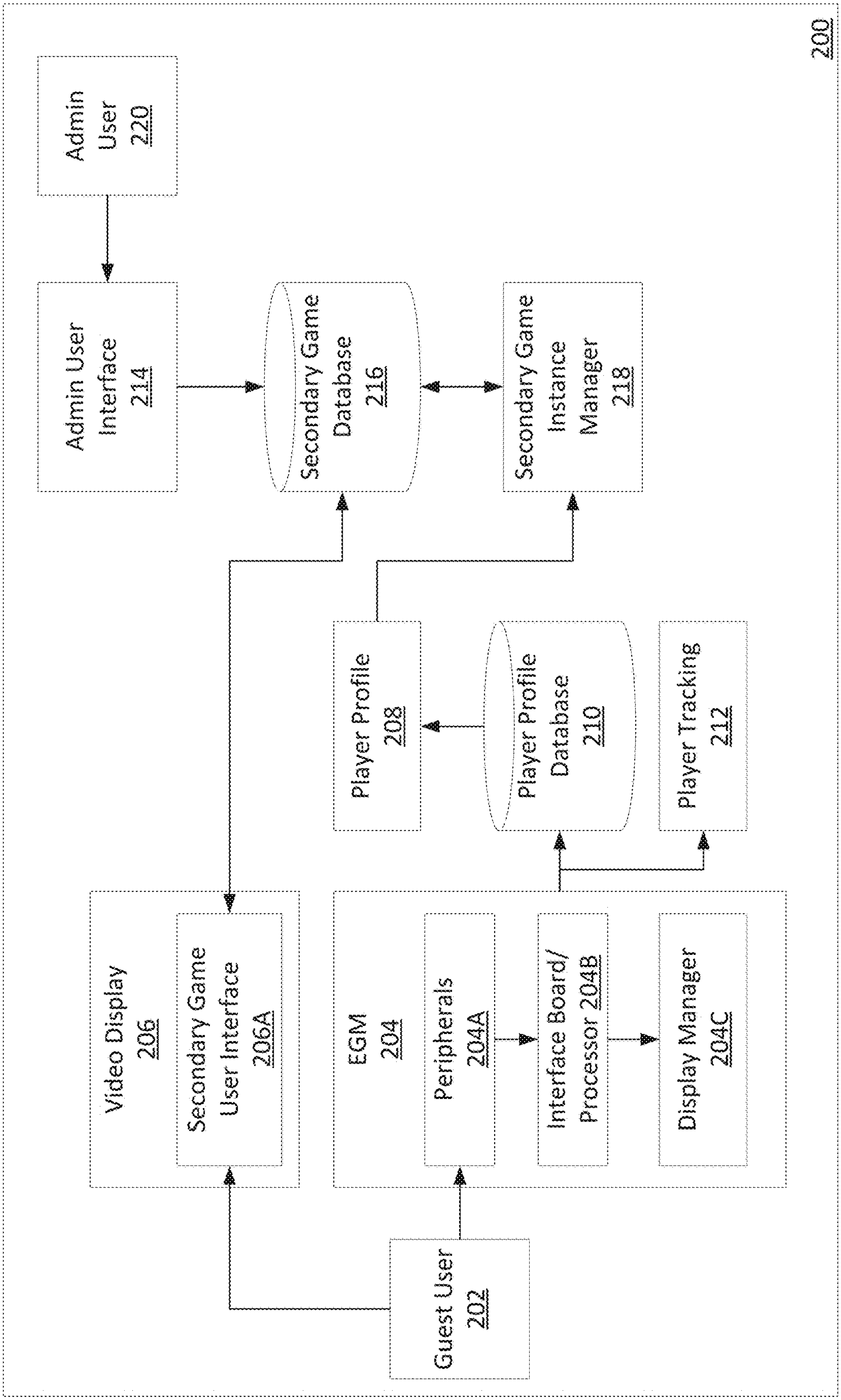
FIG. 2 illustrates another example system for electronic game creation and management, consistent with some embodiments of this disclosure.

By way of example, FIG. 2 is a diagram illustrating another system 200 for electronic game creation and management, consistent with embodiments of the disclosure. The arrangement and number of components is for purposes of illustration and not limiting for any purpose. The systems and components of FIG. 2 may be connected through any combination of networks. It will also be appreciated, for example, that any number of guests and electronic gaming machines may be used to implement the example embodiment. Further, while the embodiment of FIG. 2 is described with reference to managing primary and secondary games, it will be appreciated that it may be similarly implemented to manage other electronic games.

As shown in FIG. 2, a game management system 200 is provided that includes a guest user 202 interacting with the peripherals 204A of an electronic gaming machine 204 to initiate and drive a primary game. Peripherals 204A may include one or more buttons, card readers, touch screens, bar code scanners, biometric input devices or other peripherals. By way of example, a guest user 202 may validate themselves or submit a wager through the peripherals 204A. The peripherals 204A of the electronic gaming machine 204 in turn interact with the interface board/processor 204B and display manager 204C of the electronic gaming machine 204, either of which may send information to a player tracking 212 or a player profile database 210. For example, the electronic gaming machine 204 upon receiving validation data and a wager from guest user 202 through peripherals 204A may convert or send the received information to player profile database 210. In some embodiments, peripherals 204A may enable a player to initiate and play an electronically displayed game, such as a primary and/or secondary game. Additionally, in some embodiments, no wager may be needed from a player to initiate or participate in a primary or secondary game. In some embodiments, wagers submitted for a primary game may be recorded and controlled as a function of the underlying electronic gaming machine 204. Thus, regulated wager-based play activity may continue with the primary game while a player participates in a secondary game.

The player profile database 210 updates the player profile 208 which in turn updates the secondary game instance manager 218. For example, the player profile database 210 may send player validation or wager information to or in the form of player profile 208, which in turn is received by secondary game instance manager 218. The secondary game instance manager 218, which may include a controller and other components (e.g., a scheduler or data analyzer, not shown in FIG. 2), may send and store such information in the secondary game database 216 for future access and management of secondary games.

In some embodiments, secondary game instance manager 218 may include a component (e.g., a controller or scheduler) for configuring options and rules for the secondary games, and monitoring and controlling network connections to game servers (not shown in FIG. 2) of the secondary games. For example, the component may include a graphical user interface element (e.g., a control panel) displayed on a screen of the scheduler (such as scheduler 104 of FIG. 1) to allow an administrator to configure options and rules. The configurable options may include a time period before a secondary game starts for accepting joining players, a time length for an opening ceremony of the secondary game, a time length of a game session, a time length for a closing or prize ceremony of the secondary game, a score multiplier for multiplying a score of a winning player, or the like. The rules may include a duration of the secondary game, a scoring scheme of the secondary game (e.g., a single-round or multi-round scoring scheme), the number of players of the secondary game, whether players of a secondary game need to use game tokens associated with their player profiles for joining or initiating the secondary game, whether special effects (e.g., freezing, shielding, or interfering with other players) are allowed in the secondary game, whether powerups are allowed to be used in the secondary game, whether access to the secondary game is restricted for some players, whether the players are allowed to request prizes, whether simulated players (e.g., artificial intelligence players created by the game server) participate the secondary game, or the like.

In some embodiments, rules can also be set for determining an outcome of a secondary game based on primary game state data received and parsed by data analyzer 106 in FIG. 1. For example, the rule can set the multiplier or scoring for players of the secondary game based on whether the primary game is in a bonus round or based on the levels of the players. In some embodiments, secondary game instance manager 218 may also allow configuration of options for a live streaming service of the secondary game or other network connection parameters, monitoring usage statuses and geological locations of electronic gaming machines.

In some embodiments, player profile 208 or electronic data thereof may be stored on secondary game database 216. The secondary game database 216 may also receive and store instructions from an administrator user 220 through an administrator user interface 214 to drive a secondary game. The instructions and other input may be used by secondary game database 216 to initiate and manage secondary games. By way of example, administrator user 220 may provide input via administrator user interface 214 to schedule a secondary game by date, time, or location. Administrator user 220 may also provide input to set parameters for the secondary game, such as the permitted game type(s) and availability of powerups.

Secondary game instance manager 218 may also interact with a secondary game user interface 206A rendered through a video display 206. For example, the secondary game instance manager 218 may send leaderboard updates for display to the secondary game user interface 206A through video display 206. Video display 206 may be located with or proximate to electronic gaming machine 204. In some embodiments, video display 206 (including user interface 206A) may be implemented with a separate gaming machine, such as a gameplay client device or other computing device. In other embodiments, video display 206 may be communicatively connected to or part of a display of electronic gaming machine 204. Through video display 206 (e.g., touch screen capabilities in secondary game user interface 206A) or peripherals 204A, guest user 202 may request initiation of a secondary game or provide other inputs (such as a request to participate or join a secondary game), that are conveyed to secondary game instance manager 218. Also, in some embodiments, because the primary game may be played multiple times in a single instance of the secondary game, guest user 202 may send multiple wagers to electronic gaming machine 204 using peripherals 204A as the primary game is repeatedly played on the electronic gaming machine. The transfer of information described above may happen many times during a single session of the secondary game. Furthermore, game management system 200 may monitor the inputs (such as through secondary game user interface 206A or peripherals 204A) and data feeds (such as through player tracking 212) from each participating electronic gaming machine 204. The inputs and feeds are then used to drive player progression, position, or scoring of the secondary game by the game management system 200.

Figure 3:
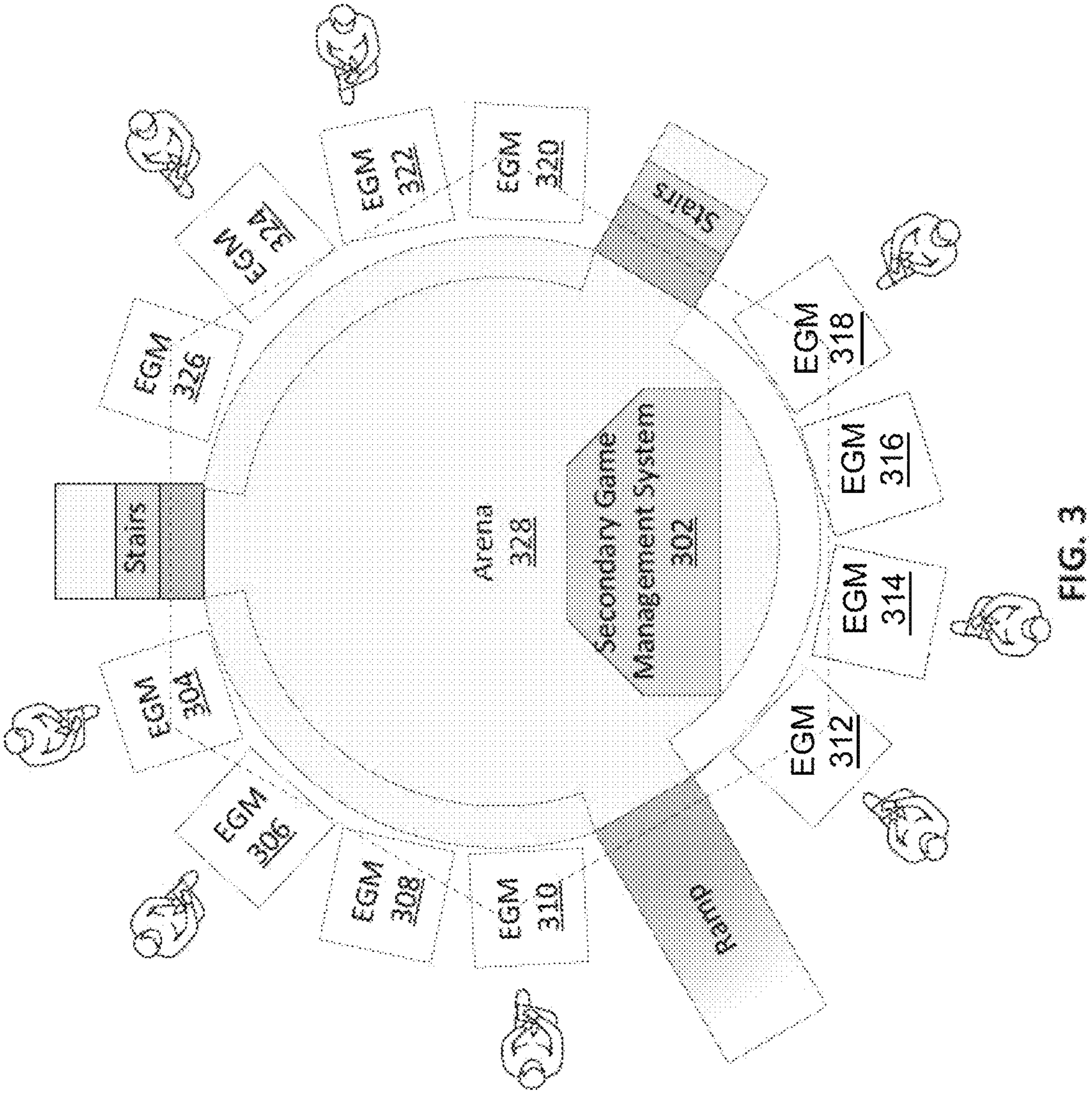
FIG. 3 illustrates an example environment for a secondary game creation and management system, consistent with some embodiments of the disclosure.
Figure 4:
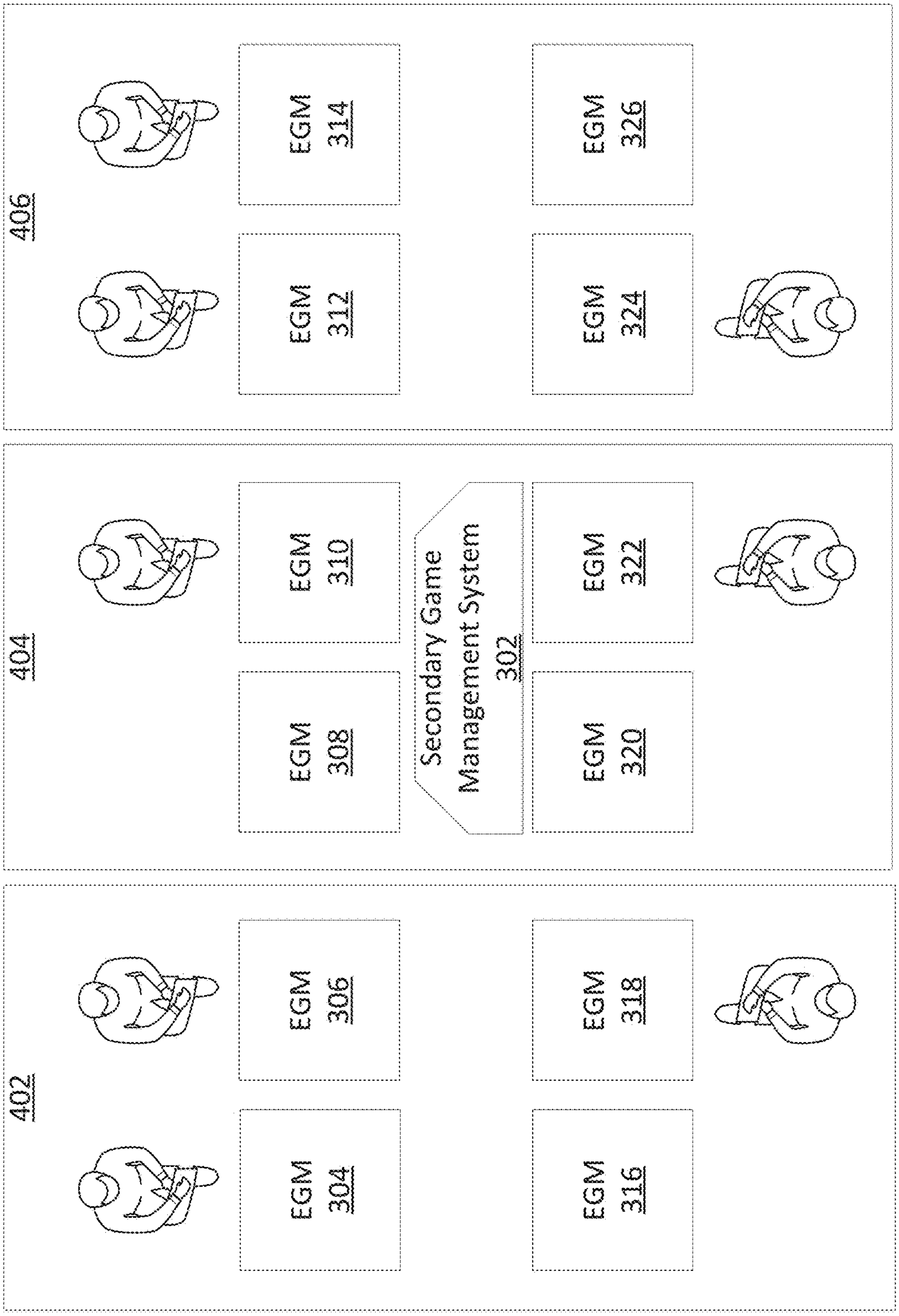
FIG. 4 illustrates another example environment for a secondary game creation and management system, consistent with some embodiments of the disclosure.
Figure 5:
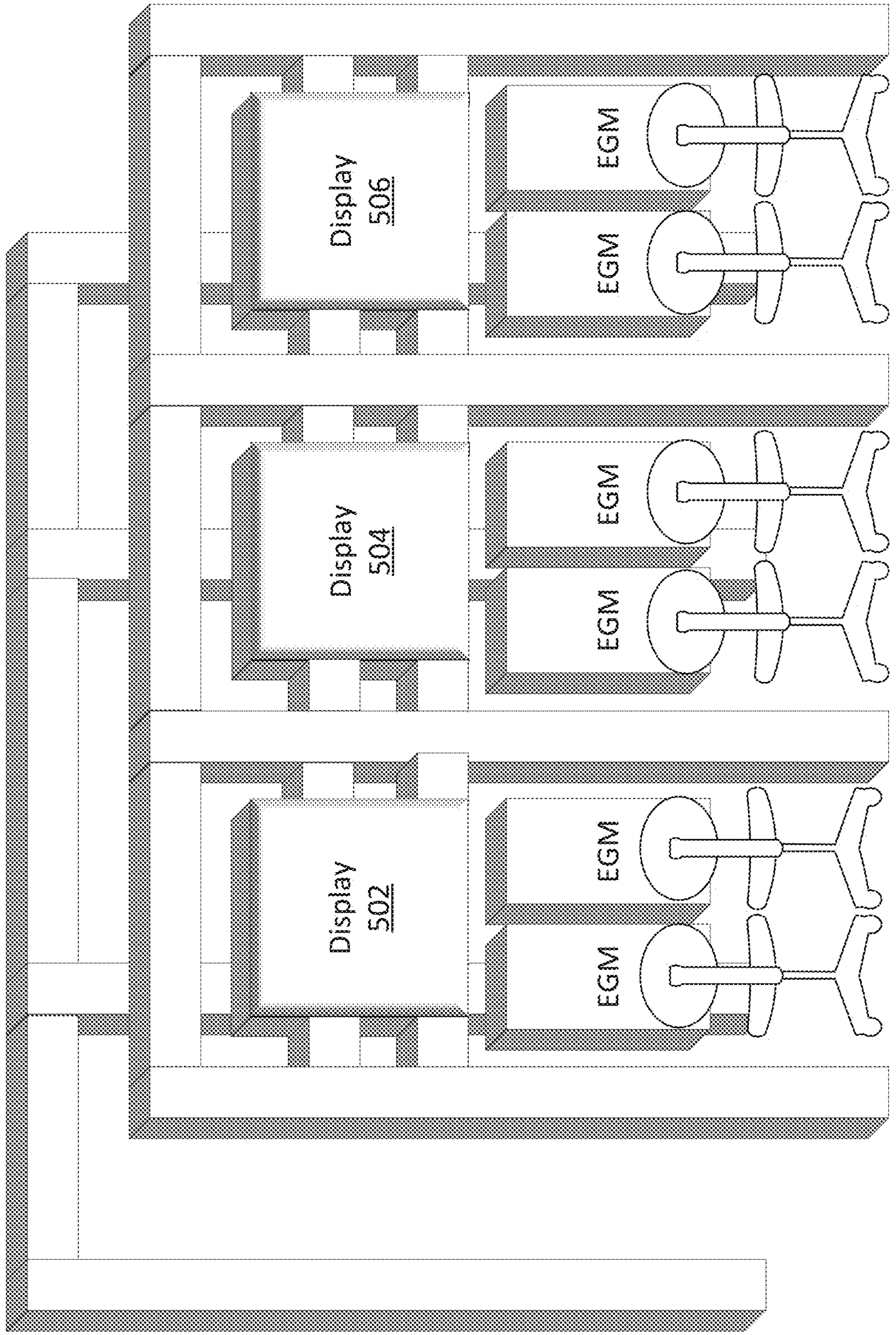
FIG. 5 illustrates another view of an example environment for a secondary game creation and management system, consistent with embodiments of the disclosure.

FIGS. 3, 4, and 5 illustrate example environments for a secondary game creation and management system, consistent with the present disclosure. The example environments may be implemented using an electronic game management system, such as system 100 in FIG. 1 and/or system 200 in FIG. 2. These figures are meant to be non-limiting and represent only aspects of embodiments of this disclosure. Also, it will be appreciated, that the components and systems of these embodiments may be connected through any combination of networks.

As shown in FIG. 3, a plurality of electronic gaming machines 304, 306, 308, 310, 312, 314, 316, 318, 320, 322, 324, and 326 are provided for participating in an electronic game, such as a secondary game. The electronic gaming machines 304-326 may be arranged on a casino floor around a designated arena 328. In some embodiments, there may be one or more such arenas staged in a casino or across multiple casino locations. By way of example, designated arena 328 may have an elevated stage (not shown in FIG. 3) and one or more ramps and stairs may be provided for access to the arena. In some embodiments, a live attendant or host may be on the arena for announcements during a tournament or playing of a secondary game.

As depicted in FIG. 3, the secondary game management system 302 may be physically located, in-part or whole, in proximity to the electronic gaming machines 304, 306, 308, 310, 312, 314, 316, 318, 320, 322, 324, and 326, participating in the secondary game. Parts of the secondary game management system 302 may also be located not in near physical proximity to the electronic gaming machines 304, 306, 308, 310, 312, 314, 316, 318, 320, 322, 324, and 326. As shown in FIGS. 3 and 4, one or may gaming machines may be vacant and therefore not including a player participating in a secondary game, such as electronic gaming machines 308, 316, 320 and 326. Furthermore, machines that are not vacant (e.g., electronic gaming machines 312 and 322) may not participate in a secondary game, although the players at such machines may be engaging in other games, such as primary games or other electronically displayed games.

By way of further example, one or more video displays (not shown) of the secondary game management system 302 may be located in near physical proximity to the arena and electronic gaming machines, while other components such as the supporting modules and server components, are in network communication but located elsewhere. Such video displays may display information related to the secondary games and/or other games or information (such as tournament games, casino promotions, etc). In some embodiments, the video displays of system 302 may be implemented as large scale or billboard displays and function at least partly as spectacle client displays to permit viewing of the gameplay in a secondary game while it is played by others. The designated arena 328 may be configured in different layouts, such as those illustrated in FIGS. 3 and 4.

As shown in FIG. 4, one or more of electronic gaming machines 304, 306, 308, 310, 312, 314, 316, 318, 320, 322, 324, and 326, participating in an electronic game such as a secondary game may be configured in groups of four electronic gaming machines, such as groups 402, 404, and 406 or in any other interval or grouping. These groups may be physically located in the same floor area of a casino, or they may be placed in separate areas or locations with the same casino or across multiple casinos. A communication network (not shown in FIG. 4) may support the transfer of data, inputs, and instructions between the electronic gaming machines 304-326 and the secondary game management system 302. In some embodiments, more electronic gaming machines, may be incrementally added with no upper boundary. Additionally, there may be display panels and lights above the electronic gaming machines reflecting the status of the secondary game, such as displays 502, 504, and 506, as shown in FIG. 5. Furthermore, the secondary game system may use a portion of the video display screen(s) of the underlying electronic gaming machines for secondary game initiation, management, and status display. The video display screens may have touch screen capabilities and/or segmented display areas.

FIG. 5 depicts another view of the environment depicted in FIG. 4. As shown in FIG. 5, there may be displays 502, 504, and 506 above a pair of electronic gaming machines. A display or an electronic tablet may also be located adjacent to each electronic gaming machine. These displays or tablets (or another input device) 502, 504, and 506 may be paired with the electronic gaming machines such that they reflect the status of the secondary game associated with the electronic gaming machines individually, in groups, or for all electronic gaming machines. The displays 502, 504, and 506 may show relevant information, such as information related to the primary game(s) and/or secondary game(s) or the players associated with the electronic gaming machines.

When a player plays a primary game on a first gaming machine (e.g., a slot machine), there may be a secondary game played on one or more second gaming machines (e.g., a computer, a tablet, or other gaming machine) which may be communicatively coupled to the first gaming machine. By way of example, the secondary game may be a multiplayer game played by multiple players. Some or all of those same players may play the one or more primary games. In such arrangements, it may be challenging to synchronize the game state data from various gaming machines and dynamically determine one or more cutscenes to be displayed for reflecting a game status of the secondary game. For example, the cutscene may represent an event (e.g., a taking over in a car racing game) in the secondary game. When there are multiple cutscenes to be played, it may also be challenging to determine and update the order of playing the cutscenes. It may also be a challenge to present those cutscenes on other displays or terminals, such as those viewed by other players or spectators. Cutscene selection and management is also challenging for other electronically displayed games, including where there are multiple gaming machines and players and/or spectators. Cutscene selection and display must be done dynamically and efficiently, while maintaining smooth and natural transition of the display of the game consistent with the game state and event sequence.

Aspects of this disclosure relate to cutscene management in a game, including implementations provided as systems, apparatuses, methods, and non-transitory computer-readable media. The disclosed embodiments address the above challenges and provide dynamic cutscene management and control. For ease of description, example systems are described below, with the understanding that aspects to the disclosed systems apply equally to other implementations, such as methods, apparatuses, and non-transitory computer-readable media. For example, some aspects of the systems can be implemented by an apparatus, a method or with program code or computer instructions stored in a non-transitory computer-readable medium. Conversely, the same applies to the example embodiments of apparatus and methods described herein. Therefore, it will be appreciated that the disclosed embodiments are not limited to any particular physical or electronic instrumentalities, but rather can be accomplished using many different instrumentalities.

Figure 6:
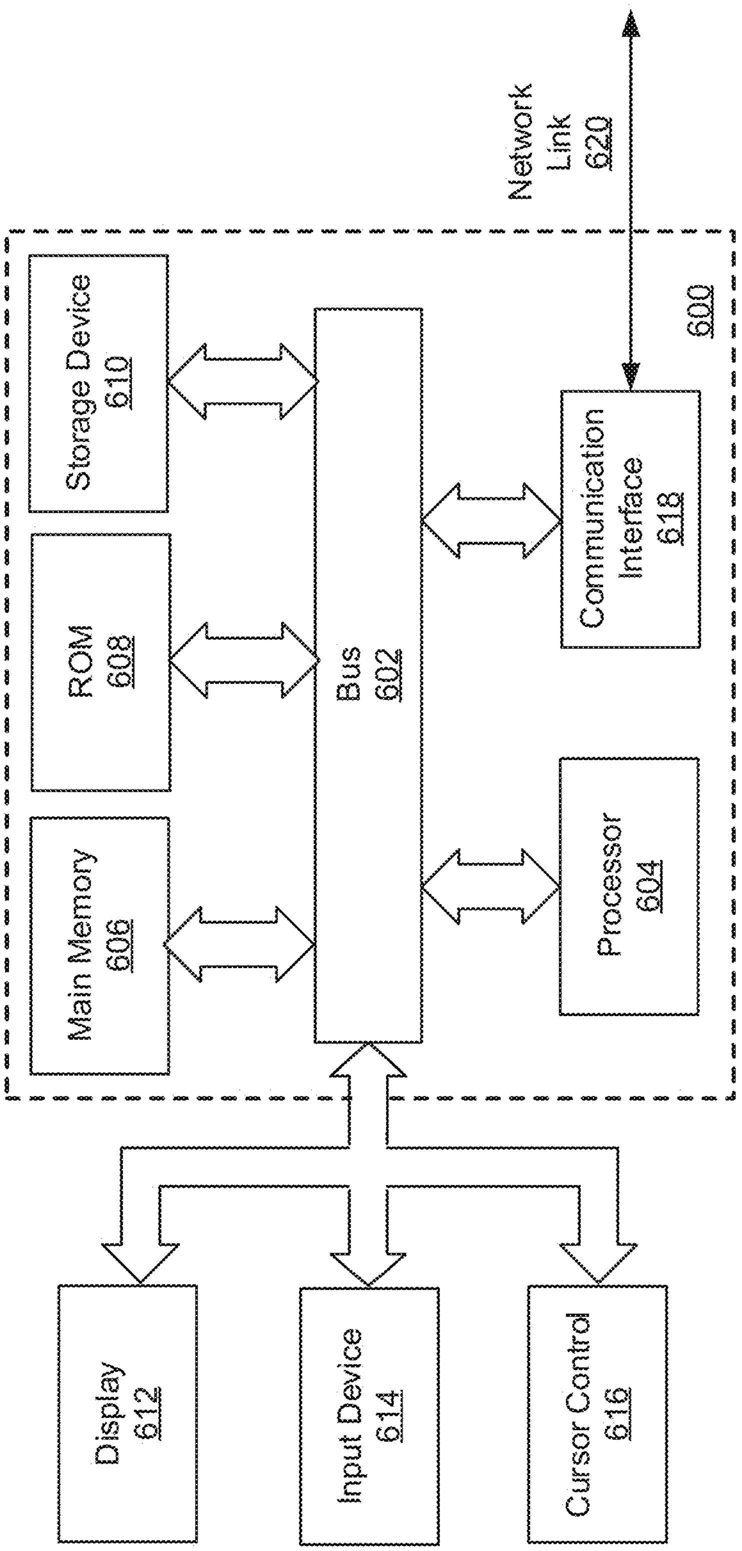
FIG. 6 illustrates an example apparatus for cutscene management in an electronically displayed game, consistent with embodiments of this disclosure.

By way of example, FIG. 6 is a block diagram illustrating an example apparatus 600 for cutscene management in an electronically displayed game, consistent with embodiments of this disclosure. Apparatus 600 may be used to implement a computing device, server, or gaming machine, such as those described herein. For example, apparatus 600 may be a server computer. A server computer (or "server"), as used herein, may include any computing device providing computing services. A server in this disclosure may be implemented in the form of a single computer or a computer cluster that includes multiple computers communicatively coupled to each other (e.g., via a wired or wireless network). The computers in a computer cluster may be at the same or different geographic locations and/or communicatively couple to a network. For example, the computer cluster may be implemented as a cloud computing service.

As illustrated in FIG. 6, computer system 600 includes a bus 602 or network or other communication mechanism for communicating information, and hardware processor 604 coupled with bus 602 for processing information. Hardware processor 604 can be, for example, a general-purpose microprocessor. Computer system 600 also includes a main memory 606, such as a random access memory (RAM) or other dynamic storage device, coupled to bus 602 for storing information and instructions to be executed by processor 604. Main memory 606 also can be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

In some embodiments, computer system 600 can be coupled via bus 602 to display 612, such as a cathode ray tube (CRT), liquid crystal display, or touch screen, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. The input device typically has two degrees of freedom in two axes, a first axis (for example, x) and a second axis (for example, y), that allows the device to specify positions in a plane.

Computer system 600 can implement disclosed embodiments using customized hard-wired logic, one or more ASICs or FPGAs, firmware and/or program logic which in combination with the computer system causes or programs computer system 600 to be a special-purpose machine. According to some embodiments, the operations, functionalities, and techniques disclosed herein are performed by computer system 600 in response to processor 604 executing one or more sequences of one or more instructions contained in main memory 606. Such instructions can be read into main memory 606 from another storage medium, such as storage device 610. Execution of the sequences of instructions contained in main memory 606 causes processor 604 to perform process steps consistent with disclosed embodiments. In some embodiments, hard-wired circuitry can be used in place of or in combination with software instructions.

The term "storage media" can refer, but is not limited, to any non-transitory media that stores data and/or instructions that cause a machine to operate in a specific fashion. Such storage media can comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but can be used in conjunction with, transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infrared data communications.

Various forms of media can be involved in carrying one or more sequences of one or more instructions to processor 604 for execution. For example, the instructions can initially be carried on a magnetic disk or solid-state drive of a remote computer. The remote computer can load the instructions into its dynamic memory and send the instructions over a network line communication line using a modem, for example. A modem local to computer system 600 can receive the data from the network communication line and can place the data on bus 602. Bus 602 carries the data to main memory 606, from which processor 604 retrieves and executes the instructions. The instructions received by main memory 606 can optionally be stored on storage device 610 either before or after execution by processor 604.

Computer system 600 also includes a communication interface 618 coupled to bus 602. Communication interface 618 provides a two-way data communication coupling to a network link 620 that is connected to a local area network or a wide-area network. For example, communication interface 618 can be an integrated services digital network (ISDN) card, cable modem, satellite modem, or a modem to provide a data communication connection to a corresponding type of telephone line. As another example, communication interface 618 can be a local area network (LAN) card to provide a data communication connection to a compatible LAN. Communication interface 618 can also use wireless links. In any such implementation, communication interface 618 sends and receives electrical, electromagnetic, or optical signals that carry digital data streams representing various types of information.

Network link 620 typically provides data communication through one or more networks to other data devices. For example, network link 620 can provide a connection through a local area network to other computing devices connected to the local area network or to an external network, such as the Internet or other wide area network. These networks use electrical, electromagnetic, or optical signals that carry digital data streams. The signals through the various networks and the signals on network link 620, and through communication interface 618, which carry the digital data to and from computer system 600, are example forms of transmission media. Computer system 600 can send messages and receive data, including program code, through the network(s), network link 620 and communication interface 618. In the Internet example, a server (not shown) can transmit requested code for an application program through the Internet (or wide area network), the local area network, and communication interface 618. The received code can be executed by processor 604 as it is received, and/or stored in storage device 610, or other non-volatile storage for later execution.

Consistent with embodiments of this disclosure, a computer-implemented gaming system may include a plurality of electronic gaming machines. As disclosed herein, each electronic gaming machine may be configured for hosting an electronically displayed game, such as a primary game. Hosting a game, as used herein, may include initiating, running, monitoring, administering, controlling, maintaining, terminating, restarting, storing, and/or any other computer operations to operate the game for a player to play.

By way of example, the plurality of electronic gaming machines may include the electronic gaming machines 108, 110, 112, 204, or 304-326 described in association with FIGS. 1-5. In some embodiments, at least two of the plurality of electronic gaming machines may be configured for hosting different primary or other electronic games.

Consistent with embodiments of this disclosure, the computer-implemented gaming system may also include one or more game servers communicatively coupled to the plurality of electronic gaming machines. In the system, the game server may be primarily responsible for collecting and communicating the game state data for an electronic game to other devices. For example, the game receiver may receive game state data from each of the electronic gaming machines and store the game state. The game state may be used by the game server to compute a score or outcome in a game. Also, the game server may retransmit or broadcast that game state data to various clients or other devices, such as gameplay client devices and spectacle client devices, as further disclosed herein. Those devices may use the game state data to host other games and/or detect events and display the game, including a spectator view of the game.

By way of example, each game server may receive first game state data that represents a state of a primary game from the plurality of electronic gaming machines. The first game state data may include, for instance, at least one of a score associated with a player in the primary game, a result associated with the player in the primary game, a rank associated with the player in the primary game, a progression associated with the player in the primary game, a position associated with the player in the primary game, a status associated with the player in the primary game, or a game result history associated with the player in the primary game.

By way of example, each game server may be implemented according to apparatus 600 of FIG. 6. In some embodiments, the game server may be an integrated part of a game management system (e.g., included in system 100 of FIG. 1, system 200 of FIG. 2, or system 302 of FIGS. 3-4). In some embodiments, the game server may be an independent component of the game management system. The game server may be implemented on the property of a physical location (such as a casino) or may implemented online individually or as part of a cluster of server computers (such as a cloud computing service).

Consistent with embodiments of this disclosure, the computer-implemented gaming system may also include one or more gameplay client devices communicatively coupled to the game server(s). A gameplay client device may be a gaming device that is different from the electronic gaming machine that hosts, for example, a primary game. In some embodiments, the gameplay client devices host a secondary game or other electronic game. By way of example, a gameplay client device may include a smartphone, a tablet computer, a personal computer, a smart screen, a dedicated electronic gaming machine, or any other device. The gameplay client device may include a user interface and/or display for receiving gameplay inputs from a player and presenting gameplay data (e.g., scores, results, visual effects, or audios) to the player. The user interface may be implemented with, for example, an application hosted in the gameplay client device or presented on a display of the gameplay client device and supported through a website or server.

In environments where a secondary game is hosted on one or more gameplay client devices, each gameplay client device may receive the first game state data from the game server and be configured to host the secondary game based on the first game state data. Each gameplay client device may also send second game state data representing a state of the secondary game to the game server. By way of example, the second game state data may include at least one of a score associated with the player in the secondary game, a result associated with the player in the secondary game, a rank associated with the player in the secondary game, a progression associated with the player in the secondary game, a position associated with the player in the secondary game, a status associated with the player in the secondary game, or a game result history associated with the player in the secondary game. Similar game state data may also be transmitted by each gameplay client device for other hosted electronic games.

In some embodiments, a gameplay client device may be communicatively coupled to or associated with an electronic gaming machine. This arrangement may allow, for instance, a player to play a primary game on the electronic gaming machine while also playing a secondary game on the gameplay client device. By way of example, the gameplay client device may be associated with the electronic gaming machine by administrator user 220 of FIG. 2 based on any combination of a hardware identifier (e.g., a MAC address), a user interface of the application on the device, or any another method. As a further example, the gameplay client device may be a tablet computer, a smart screen, or any other peripheral device mounted on a physical supporting device (e.g., a bracket attached on an end of a gooseneck) that is connected to an associated electronic gaming machine directly or indirectly. In some embodiments, gaming system may include a plurality of gameplay client devices that support gameplay by multiple payers. The gaming system may include a first gameplay client device, a second gameplay client device, and one or more further gameplay client devices. Each gameplay client device may be communicatively coupled to the game server and configured to receive the first game state data from the game server for hosting the secondary game. The same or different secondary games may be played on the plurality of gameplay client devices. In addition, other electronic games and associated game state data may be provided and transmitted among the devices and servers in the gaming system.

Consistent with embodiments of this disclosure, the computer-implemented gaming system may also include one or more spectacle client devices communicatively coupled to the game server(s). A spectacle client device, as used herein, refers to a device that allows one or more non-playing observers to watch and follow the progression of a game (e.g., a primary game, a secondary game, or other electronic game hosted on an electronic gaming machine or gameplay client device). The spectacle client device may be a physical device (e.g., a video monitor or display at a physical location), a virtual device (e.g., implemented with a software application), or any combination thereof. In some embodiments, the spectacle client device may be incapable of affecting the state of any observed game. Instead, the spectacle client device provides a spectator view of a game being played. The spectator view may include, for example, an audience view, a theatre view, a sky view, and/or other observer views of a game. By way of example, the spectacle client device may include a television screen, a monitor, a tablet computer screen, a smartphone screen, a projection display, a ticker-type display, or any other type of electronic display or screen observable by one or more individuals. In some embodiments, a player of the secondary game, a non-playing individual of the secondary game, or both, may observe the progression of a game and cutscenes with a spectacle client device.

Consistent with embodiments of this disclosure, each spectacle client device may be configured to perform a method using at least one processor. As further disclosed herein, the method may include receiving game state data associated with an electronic game from the game server(s). The method may also include dynamically determining an event associated with the game based on the game state data. Events may be used by the spectacle client device to drive and update the displayed view of the observed game, including cutscenes, as further described herein. An event associated with a game may include an incident, an occurrence, a circumstance, or any action that changes or updates an in-game status. By way of example, an event may include at least one of a game state change in the primary game, initiation of the secondary game, invitation to play the secondary game, acceptance of invitation to play the secondary game, generation of a player list of the secondary game, a countdown to start the secondary game, starting of the secondary game, a game state change in the secondary game (e.g., a player gaining points), a game action by the player in the secondary game (e.g., applying a powerup), failure of the game action by the player in the secondary game, a countdown to complete the secondary game, or completion of the secondary game. For example, in a car racing game, the event associated with the game may include race starting, race ending, a car overtaking another, or applying an in-game powerup.

An in-game powerup, as used herein, refers to information or an in-game item (e.g., a prop) that permits a player to affect gameplay. For example, the powerup may include a score multiplier that may increase or decrease scoring, position, or progression of participating players. The score multiplier may be limited to a certain amount of time, a certain number of plays, or random amounts of time or plays in the game.

In some embodiments, a powerup may be awarded based on online activities, such as social gaming activities, or based on activities at a physical location, such as underlying electronic gaming machine play or any other reward mechanisms. Powerups may be awarded to individuals or groups and may also be gifted from one users to one or more other users. By way of example, powerups available to the player may comprise powerups relating to a secondary game which may affect secondary gameplay for one or more players of the secondary game.

In some embodiments, powerups may include a powerup to enable one or more players of a secondary game to share scoring or wins amongst themselves. The sharing may be limited to a certain amount of time, a certain number of plays, or random amounts of time or plays in the game. In some embodiments, powerups may include a powerup to enable one or more players of the secondary game to choose one or more other players of the secondary game and cause them to freeze or stop being able to play in the secondary game for a set period of time. For example, the top five players (other than the player using the powerup) may be caused to stop being able to play for a set period of time. For example, the powerup may cause the input from the electronic gaming machine of the chosen player(s) to the secondary game to freeze, preventing them from playing or earning scores on the secondary game even though the underlying primary game may continue to be played. If a selected player wins on the underlying primary game at this time, that win would still occur, but they would not receive any scoring or progression in the secondary game while the freeze remains. Alternatively, the powerup may cause a chair of the electronic gaming machine of a selected player to physically pull back and not allow the player to reach the controls. In some embodiments, there may also be powerups that may shield or block another player from using a powerup. For example, a player may have a powerup that renders a freeze against them useless. The descriptions above are meant solely as examples and there may be a wide variety of powerups implemented to alter the gameplay of a secondary game or other electronic game in a predefined way.

Consistent with embodiments of this disclosure, the method performed by the spectacle client device may further include determining a cutscene based on an event. As disclosed herein, a cutscene may include a visual representation of the event. In some embodiments, the cutscene may represent a scene change or a perspective change (e.g., from a fixed view to a bird's view or a panning-camera view) in the observed game.

In some embodiments, to determine a cutscene based on an event, the method performed by the spectacle client device may further include determining a cutscene type based on the event and selecting the cutscene from a list of predetermined cutscenes associated with the determined cutscene type. In some embodiments, the game state data of the game may not include any data representing the cutscene type. In such cases, a random cutscene may be selected by the spectacle client device. Further, in some embodiments, the spectacle client device may select a cutscene that is not a cutscene selected in an immediately previous selection of the cutscene from the list of predetermined cutscenes associated with a cutscene type. This can avoid repetition of cutscenes when more than one cutscene is available for a determined cutscene type.

Figure 7:
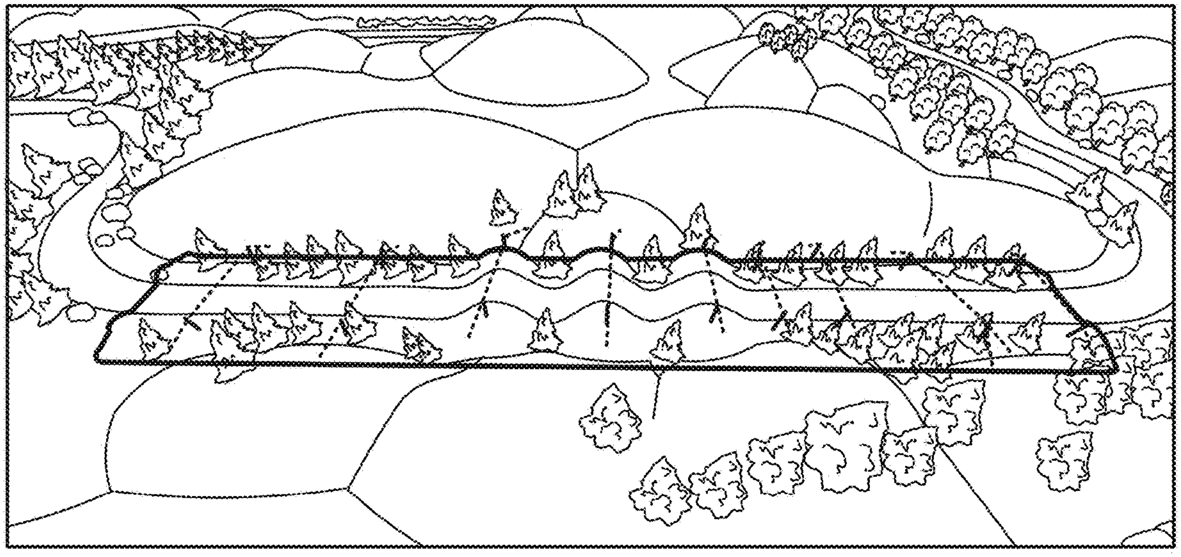
FIG. 7 illustrates an example cutscene in an electronically displayed game, consistent with embodiments of this disclosure.

By way of example, FIG. 7 is a diagram illustrating a cutscene 700 in an electronically displayed game, consistent with embodiments of this disclosure. The game may be a secondary game (e.g., a multiplayer car racing game) or other electronic game. As shown in FIG. 7, cutscene 700 shows a bird's view of a portion of the racing track for the car racing game. For example, cutscene 700 is of a first cutscene type. In the example of FIG. 7, the first cutscene type is a rural-area type.

Figure 8:
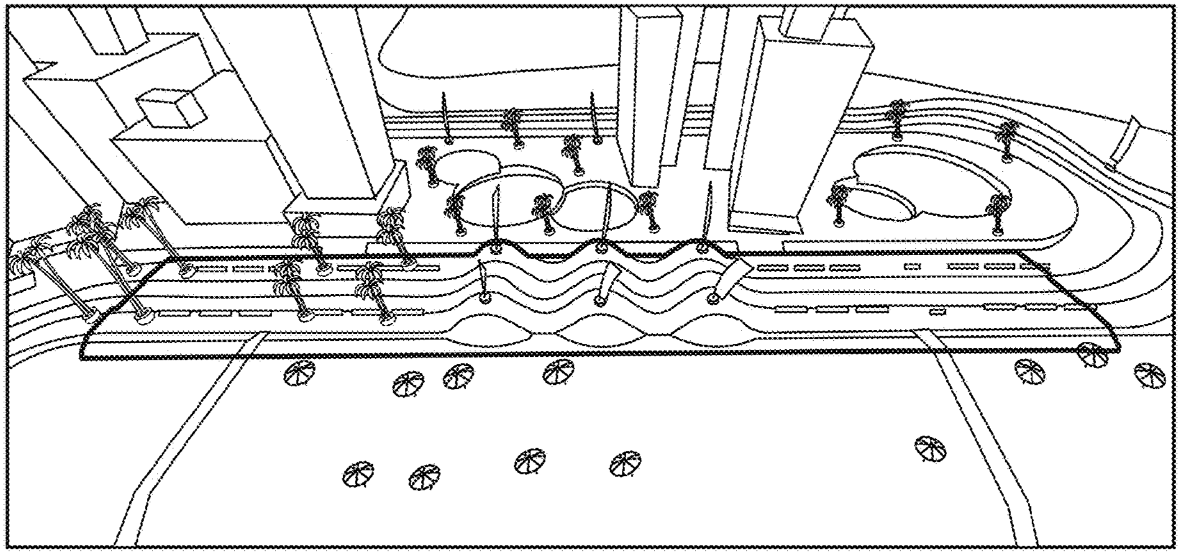
FIG. 8 illustrates another example cutscene in an electronically displayed game, consistent with embodiments of this disclosure.

By way of further example, FIG. 8 is a diagram illustrating another cutscene 800, consistent with embodiments of this disclosure. In this example, the game may be the same game associated with cutscene 700 (i.e., a multiplayer car racing game). As shown in FIG. 8, cutscene 800 shows a bird's view of a portion of the racing track for the car racing game. Cutscene 800 is of a second cutscene type. In the example of FIG. 8, the second cutscene type is a water-front or beach-area type.

As previously described, in FIGS. 7-8, the secondary game may relate to a multiplayer car racing game. Each spectacle client device may dynamically determine a cutscene based on the game state data for the game. For example, each spectacle client device may evaluate the game state data to determine a context, such as an overtake event (e.g., an event where a first car overtakes a second car) and/or a biome related to the event or where the game is presently taking place (e.g., a rural area). As used herein, a biome refers to an environment, a general area, or a location (e.g., a rural area, a beach area, a city area, etc.) where an event or the game is taking place as it proceeds during gameplay. A determined context may be either an event or biome, or a combination of an event and a biome. From the determined context (event and/or biome), a cutscene type may be identified and selected. For example, if the biome is a rural area, the spectacle client device may select cutscene 700 from a list of predetermined cutscenes associated with a rural area. As another example, the spectacle client device may determine an event where one or more cars pass a waypoint and a biome representing a water-front or beach area. The spectacle client device may then select cutscene 800 from a list of predetermined cutscenes for the determined context (i.e., an event where one or more cars pass a waypoint associated with a biome corresponding to a water-front or beach area). The relationships between game state data and contexts (i.e., events and/or biomes) and corresponding cutscene types may be programmed and/or stored in memory. In some embodiments, these relationships may be learned and identified using a neural network or they may be stored in tables, a relational database, or other data structures.

Consistent with embodiments of this disclosure, the method performed by the spectacle client device may further include inserting an identified cutscene into a cutscene queue. Each spectacle client device may store a cutscene queue that is used to manage cutscenes and their display. A cutscene queue may include one or more cutscenes associated with an electronic game (such as a secondary game), and a sequence or order for displaying the cutscene(s). In some embodiments, to insert a cutscene into the cutscene queue, the method performed by the spectacle client device may include determining a weight value associated with an event and determining a position of a corresponding cutscene in the cutscene queue based on the weight value. The weight values may be assigned based on a type of the event. For example, if the game is a multiplayer car racing game, an event representing a car passing a finish line may be assigned with a weight value higher than the weight value of another event representing, for example, a car passing another car before the finish line.

In some embodiments, to insert a cutscene into the cutscene queue, the method performed by the spectacle client device may further include determining whether the cutscene is to be displayed immediately, such as a cutscene showing a finishing car race. If the cutscene is determined to be displayed immediately, the cutscene may be inserted into the front (e.g., the first position or place) of the cutscene queue. For example, a cutscene to be displayed immediately may include at least one of a cutscene representing a new game being initiated, a cutscene representing that a pre-game countdown begin, or a cutscene representing that a game finishes. If the cutscene is determined not to be displayed immediately, the cutscene may be inserted into a non-front position (e.g., any place in the cutscene queue other than the first place). For example, the cutscene may be inserted into a place or group where cutscenes are of the same type (e.g., all being an overtaking event or all being a finishing event).

Some cutscenes may be associated with other cutscenes and/or inserted in a fixed order or sequence. For example, if a first cutscene is determined to be inserted into the cutscene queue, a second cutscene associated with the first cutscene may be determined to be inserted into the cutscene queue immediately after the first cutscene. As a result, according to the sequence of the cutscene queue, the second cutscene will be displayed immediately following the display of the first cutscene. By way of example, the first cutscene and the second cutscene may be a predetermined combination of cutscenes, such as a cutscene representing a new game being initiated and a cutscene showing a carousel prize, respectively. The first cutscene and the second cutscene may also be a cutscene showing a carousel prize and a cutscene showing a game start (e.g., a race start), respectively. The first cutscene and the second cutscene may also be a cutscene showing a powerup (e.g., shooting a bubble) being used and a cutscene showing an effect (e.g., the bubble hitting a target) of the powerup, respectively. The first cutscene and the second cutscene may also be a cutscene representing that the game finishes and a cutscene showing an after-game scene (e.g., rushing over a finish line), respectively. The first cutscene and the second cutscene may also be a cutscene showing the after-game scene and a cutscene showing a prize ceremony, respectively.

In the example where the game is a multiplayer car racing game, various cutscene queues are possible. For example, assume the game state is in a pre-game countdown, the first cutscene and the second cutscene may represent a prize carousel on offer and the race starting, respectively. The first cutscene may also be determined to be displayed immediately. In such a case, the spectacle client device may display the first cutscene immediately (e.g., by cutting off any display of a different cutscene). The first cutscene may be associated with a 20-second lifetime. After playing the first cutscene for 20 seconds, the spectacle client device may switch to display the second cutscene in the sequence of the cutscene queue. After completing displaying the second cutscene, the spectacle client device may check whether the cutscene queue is empty. If not, the spectacle client device may start playing a next cutscene from the cutscene queue.

In some embodiments, a cutscene may be associated with a weight value before being inserted into the cutscene queue. For example, a cutscene determined to be displayed immediately may be associated with a larger weight value than a cutscene determined not to be displayed immediately. In some embodiments, the order of the cutscenes in the cutscene queue may be adjusted in accordance with their weight values (e.g., from high to low or from low to high). For example, a cutscene associated with a high weight value may be inserted into a front portion of the cutscene queue, or vice versa.

In some embodiments, spectacle client device may update the cutscene queue by removing cutscenes that become outdated or irrelevant in view of newer cutscenes. Cutscenes may also be removed from the cutscene queue if they "time out" before they are displayed. As previously described, cutscenes may be identified based on events occurring during gameplay. Some cutscenes may become outdated or irrelevant before they are displayed because of subsequent events. For example, a cutscene representing an overtaking event may cause one or more existing cutscenes representing previous overtaking events to be removed from the cutscene queue. By doing so, only the cutscene representing the most recent overtaking event is to be displayed. For example, if the game is a car racing game that includes four players represented by indices 0, 1, 2, and 6, a ranking of the players at a first time may be [0, 1, 2, 6] that represents players 0, 1, 2, and 6 are in the first, second, third, and fourth places of the race, respectively. If the ranking changed to [0, 1, 6, 2], it represents that a first overtaking event occurs where player 6 overtakes player 2, and a first cutscene representing the first overtaking event may be inserted into the cutscene queue. If the ranking subsequently changed to [0, 2, 1, 6], it represents that a second overtaking event occurs where player 2 overtakes player 1 and player 6, and a second cutscene representing the second overtaking event may be inserted into the cutscene queue. If neither the first cutscene nor the second cutscene is displayed, the first cutscene may be removed from the cutscene queue because it does not represent the most recent or last ranking of the players. As a result, the sequence of cutscenes in the cutscene queue may be updated.

In some embodiments, to insert a cutscene into the cutscene queue, an insertion request may be used. For example, a first component (e.g., cutscene logic 1002, as described herein) of the spectacle client device may generate the insertion request, and a second component (e.g., cutscene manager 1004, as described herein) of the spectacle client device may receive and act on the insertion request. The insertion request may include one or more commands and a group of data representing at least one of a cutscene type, a biome, a time duration of the cutscene being in the cutscene queue, a lifetime associated with the cutscene, or a weight value associated with the cutscene. In some embodiments, the insertion request may include an additional group of data representing event-specific information of the cutscene. For example, if the event is an overtaking event, the event-specific information may include at least one of an index of an overtaking player or an index list of players being overtaken. As another example, if the event is a powerup application event, the event-specific information may include at least one of a type of the powerup, an index of a player who applies the powerup, an index list of players against whom the powerup are successfully applied, an index list of players against whom the powerup are not successfully applied, or additional information (e.g., a forward direction or a backward direction where the powerup is applied) associated with the powerup. In another example, if the event is a jackpot event, the event-specific information may include an index of a player who enters a jackpot.

Insertion requests may be implemented with one or more commands or pseudo-codes. In Table 1 below, example commands or pseudo-codes are provided for implementing insertion requests.

TABLE 1

```
public struct QueuedCutsceneRequest
{
public QueuedCutsceneType CutsceneType;
public string Biome;
public float TimeInQueue;
public float TimeOutAge;
public float BaseImportance;
// For overtakes only
public int OvertakerPod;
public List<int> OvertakenPods;
// For pokes only
public PokeType PokeType;
public int PokeUserPod;
public List<int> PokeSuccessPods;
public List<int> PokeShieldedPods;
public int PokeExtraInfo;
// For Jackpot only
public int JackpotUserPod;
};
```

In Table 1, "CutsceneType" represents the cutscene type (e.g., a type for driving, overtaking, applying a powerup, successfully application of a powerup, race starting, race ending, biome changing, or entering a jackpot). The parameter "Biome" represents a biome. The parameter "TimeInQueue" represents the time duration of the cutscene being in the cutscene queue. For example, the "TimeInQueue" may be increased by a length of time having elapsed since the most recent update of the cutscene queue. The parameter "TimeOutAge" may represent the lifetime associated with the cutscene. For example, if "TimeOutAge" has a value of −1, the cutscene may have an infinite lifetime unless the cutscene queue is actively cleared. If "TimeOutAge" has a positive value, when "TimeInQueue" is equal to or greater than "TimeOutAge," the cutscene will be removed from the cutscene queue. The parameter "BaseImportance" may represent the weight value associated with a cutscene. For example, the order of the cutscenes in the cutscene queue may be determined by sorting the values of "BaseImportance." The parameters "OvertakerPod" and "OvertakenPods" are parameters to an overtaking event, representing the index of the overtaking player and the index list of the players being overtaken, respectively. The parameters "PokeType," "PokeUserPod," "PokeSuccessPods," "PokeShieldedPods," and "PokeExtraInfo" are parameters to a powerup event, representing the type of the powerup, the index of the player who applies the powerup, the index list of the players against whom the powerup are successfully applied, the index list of the players against whom the powerup are not successfully applied, and the additional information associated with the powerup, respectively. The parameter "JackpotUserPod" is a parameter to a jackpot event, representing the index of the player who enters a jackpot.

By way of example, for an insertion request representing an overtaking event, all prior insertion requests representing prior overtaking events may be ignored for processing. With reference to the example pseudo-code in Table 1, the insertion request may include parameter "CutsceneType" set as a value representing the overtaking event, parameter "TimeOutAge" set as two seconds, parameter "OvertakerPod" set as an index of an overtaking player, and parameter "OvertakenPods" with values representing indices of overtaken players in an order of being overtaken. Such an insertion request may remove its associated cutscene from the cutscene queue if the inserted cutscene cannot be displayed within two seconds after the cutscene being inserted into the cutscene queue.

As a further example, for an insertion request representing a countdown event, the cutscene queue may be actively cleared (e.g., by removing all cutscenes from the cutscene queue). A first cutscene representing the countdown may be inserted into the cutscene queue, followed by the insertion of a second cutscene representing a prize introduction carousel. The insertion request may include parameter "CutsceneType" set as a value representing a race starting event and parameter "TimeOutAge" set as −1. Such an insertion request may cause the first cutscene and the second cutscene to have infinite lifetime, in which full lengths of the first cutscene and the second cutscene may be displayed before displaying the next cutscene (if any) from the cutscene queue.

Consistent with embodiments of this disclosure, the method performed by the spectacle client device may include displaying the cutscene. In some embodiments, the cutscene queue may include a plurality of cutscenes. In such a case, after displaying a first cutscene, the spectacle client device may remove the first cutscene from the cutscene queue and then display a second cutscene. That is, according to the order in cutscene queue, the second cutscene may follow the first cutscene in the cutscene queue.

In some embodiments, to display a second cutscene, the method performed by the spectacle client device may further include determining a lifetime associated with the second cutscene. The lifetime may start to time when the second cutscene is inserted into the cutscene queue. A lifetime associated with a cutscene, as used herein, refers to a duration, a temporal period, or any length of time during which the cutscene remains displayable. In response to the lifetime for the second cutscene lapsing before completion of displaying the first cutscene, the method performed by the spectacle client device may further include removing the second cutscene from the cutscene queue.

In some embodiments, if a cutscene queue is empty after displaying a cutscene, the method performed by the spectacle client device may further include displaying one or more random cutscenes. For example, the random cutscene may be randomly selected from a set of pre-rendered or identified cutscenes. In some embodiments, the random cutscene may be unrelated to the last or current event associated with the secondary game. In some embodiments, the random cutscene may be a cutscene that has been previously displayed by the spectacle client device.

By way of example, the spectacle client device may display the first cutscene, and insert the second cutscene into the cutscene queue after the first cutscene before completion of the display of the first cutscene. The first cutscene may need a first duration (e.g., 15 seconds) for the spectacle client device to complete displaying the first cutscene. The spectacle client device may determine a lifetime (e.g., 10 seconds) associated with the second cutscene, and the lifetime starts to time when the spectacle client device inserts the second cutscene (e.g., at 3 seconds) of displaying the first cutscene. In such an example, the lifetime of the second cutscene lapses (e.g., at 13 seconds) before completion of displaying the first cutscene. When the lifetime lapses, the spectacle client device may remove the second cutscene from the cutscene queue. After completing the display of the first cutscene (e.g., at 15 seconds), the spectacle client device may start displaying a third cutscene in the cutscene queue. If the cutscene queue is empty after displaying last cutscene, the spectacle client device may display a random cutscene.

In some embodiments, the method performed by the spectacle client device may further include displaying a location associated with the cutscene type and the event. The method may also include displaying an object in the location and a name associated with the object. Some cutscenes may include the location, the object, and the name. By way of example, with reference to FIGS. 7-8, the cutscene may be cutscene 700 or 800, and the event may be all cars pass the finish line. In such a case, the spectacle client device may display a finish-line location associated with cutscene 700 or cutscene 800, and display all cars at the finish-line location and respective player names associated with the cars.

In some embodiments, if the cutscene queue includes a plurality of cutscenes, and if the spectacle client device displays a location associated with a cutscene type and an event associated with a first cutscene, the method performed by the spectacle client device may further include determining a change of the location. For example, the change of the location may include a change from a rural area (e.g., a rural area associated with cutscene 700 in FIG. 7) to a beach area (a beach area associated with cutscene 800 in FIG. 8). The method may also include determining a second cutscene based on the change of the location. The method may further include displaying the determined second cutscene.

In some embodiments, the method performed by the spectacle client device may further include determining a time duration for a cutscene. The method may also include displaying the cutscene for the time duration. For example, after the time duration for displaying the cutscene, the spectacle client device may proceed to displaying a next cutscene (e.g., a cutscene in the cutscene queue or a random cutscene as described herein) or stop displaying any cutscene.

Consistent with embodiments of this disclosure, the method performed by the spectacle client device may further include, in response to receiving the second game state data from the game server, determining whether a difference exists between the second game state data and local game state data. The local game state data may be stored in the spectacle client device. For example, the local game state data may be a copy of second game state data previously received from the game server. Based on a determination that difference exists between the second game state data and the local game state data, the method may further include updating the local game state data using the second game state data. For example, the spectacle client device may replace the local game state date with the second game state data for storage.

In some embodiments, if the spectacle client device determines that a difference exists between the second game state data and the local game state data, the spectacle client device may determine the event associated with the secondary game based on the difference.

Consistent with some embodiments of this disclosure, if the cutscene queue includes a plurality of cutscenes, the method performed by the spectacle client device may further include determining a transition event (e.g., a transition event in a first cutscene). The method may also include determining a second cutscene based on the transition event. The method may further include displaying the second cutscene. By way of example, the transition event may represent at least one of a game action (e.g., applying a powerup) by a player in the game, failure of the game action (e.g., failing to apply a powerup) by the player in the game, completion of a milestone or waypoint in the game, or a game state change (e.g., changing an area or biome) associated with the player in the game.

By way of example, with reference to FIGS. 7-8, the game may be a multiplayer car racing game, in which a portion of the track is displayed (e.g., in cutscene 700 or 800). The game may include one or more milestones or waypoints (not shown in FIGS. 7-8). If one or more of the cars pass the milestones or waypoints, the spectacle client device may determine that a transition event occurs. For example, before passing the milestone or waypoints, the spectacle client device may display cutscene 700 and/or other cutscenes to display that the cars are racing in a rural area. After passing the milestone or waypoints, the spectacle client device may determine the transition event that represents a transition from the rural area to a water-front or beach area, for example. Then, in response to the transition event, the spectacle client device may identify cutscene 800 or other cutscenes associated with the beach area to display.

Consistent with embodiments of this disclosure, the method performed by the spectacle client device may further include sending message data to the game server(s). The message data may include, for example, a request for game state update or identification data (e.g., a machine identifier or a MAC address) of the spectacle client device. It will be appreciated from this disclosure that other types of message data or requests may be implemented.

Figure 9:
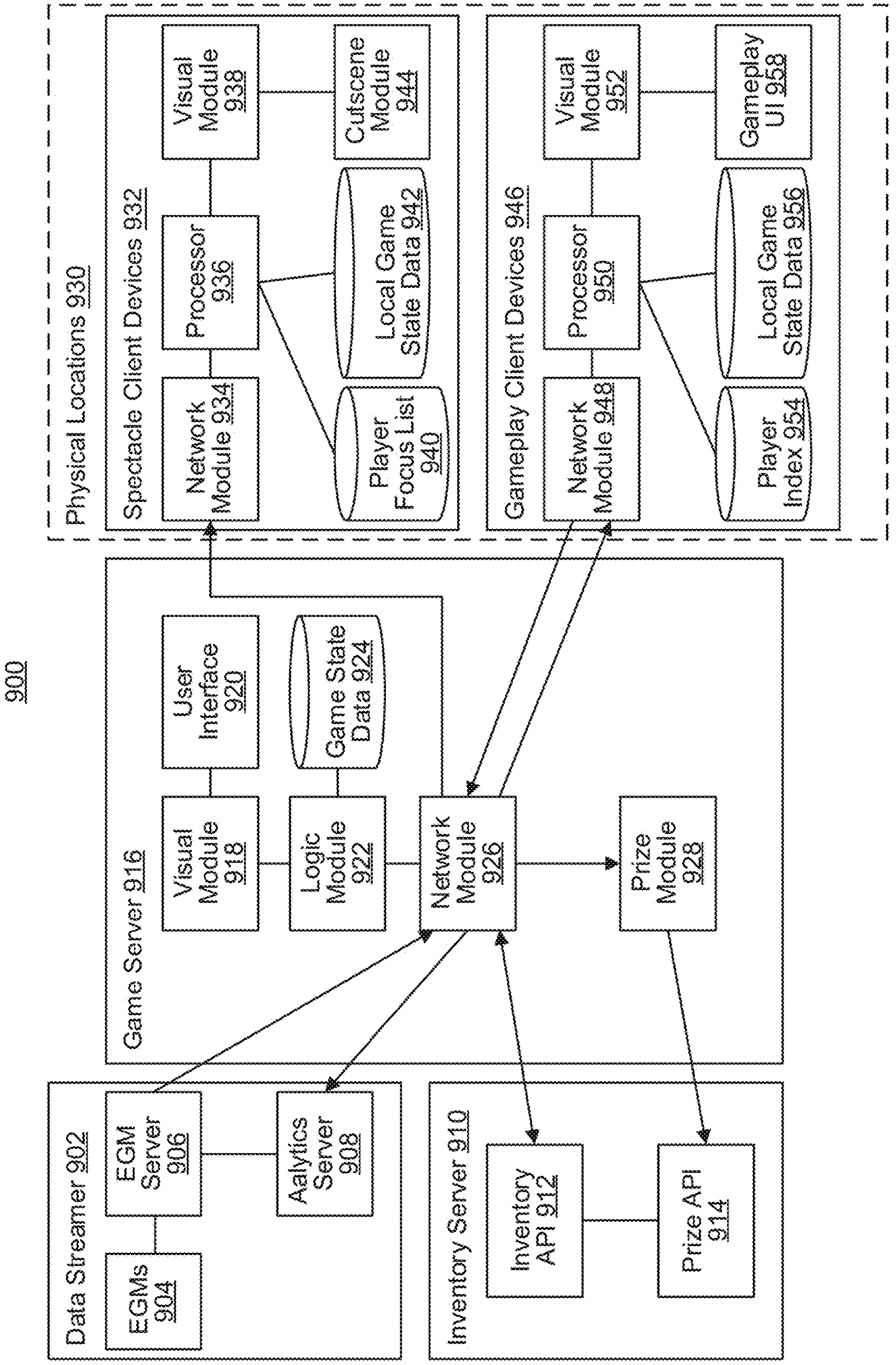
FIG. 9 illustrates an example system for cutscene management in an electronically displayed game, consistent with embodiments of this disclosure.

By way of example, FIG. 9 illustrates an example system 900 for cutscene management in an electronically displayed game, consistent with embodiments of this disclosure. It should be noted that system 900 is for illustration purposes only and implementations of the system for cutscene management are not limited to the example shown in FIG. 9. For example, the number and arrangement of components in system 900 may be modified or adjusted depending on the application or needs of the system. Further, each component or module of system 900 may be implemented with software, firmware, or hardware, or any combination thereof. Further, each component of system 900 may be combined with one or more other components of system 900 or may be divided into multiple sub-components and is not limited to the example embodiment shown in FIG. 9.

As illustrated in FIG. 9, system 900 includes a data streamer 902, an inventory server 910, a game server 916, one or more spectacle client devices 932, and one or more gameplay client devices 946. Spectacle client devices 932 and gameplay client devices 946 may be at one or more physical locations 930. It should be noted that the number and arrangement of spectacle client devices 932 and gameplay client devices 946 may vary and they may be provided in any quantity or arrangement at one or more physical locations.

Data streamer 902 may be used to manage data communications (e.g., streaming data) between a plurality of electronic gaming machines (EGMs) 904 and game server 916. For example, data streamer 902 may be implemented as a distributed data streaming platform (e.g., APACHE KAFKA®). As illustrated in the example embodiment of FIG. 9, data streamer 902 may be communicatively coupled to (e.g., via wired and/or wireless networks) the EGMs 904. Each EGM 904 may host a primary game (e.g., a slot game, a bingo game, etc.). Each EGM 904 may transmit game state data (e.g., first game state data of a primary game) to an EGM server 906. EGM server 906 may be communicatively coupled via any combination of networks (e.g., local area networks and/or wide area networks) with the plurality of EGMs 904. EGM server 906 may also be communicatively coupled to (e.g., via wired and/or wireless networks) an analytics server 908. Analytics server 908 may receive game data from EGM server 906 and perform data analysis (e.g., win rate and player analysis) for operations of the EGMs 904.

Inventory server 910 may store player-related data and data related to prizes of games. Inventory server 910 may include multiple application programming interfaces (APIs), including an inventory API 912 and a prize API 914. Inventory API 912 may provide a computer-communication interface for exchanging inventory-related data (e.g., a player status request or an inventory redemption request). Prize API 914 may provide a computer-communication interface for receiving prize-related data (e.g., a prize request or a prize information request). Inventory API 912 may be communicatively coupled to prize API 914 and other components, as shown in FIG. 9.

Game server 916 may be provided for data exchange, synchronization, and other operations, as disclosed herein. Game server 916 may be communicatively coupled to (e.g., via wired and/or wireless networks) data streamer 902 and inventory server 910. As illustrated in FIG. 9, game server 916 may include a visual module 918, a logic module 922, a network module 926, and a prize module 928. Visual module 918 may provide a user interface 920 for configuration of one or more modules of game server 916. Logic module 922 may be implemented with a processor and associated with visual module 918 and network module 926 for processing data. For example, logic module 922 may manage the exchange of game state data and/or determine data to be exchanged with spectacle client device 932 or gameplay client device 946. Network module 926 may be communicatively coupled to data streamer 902 and inventory server 910. For example, network module 926 may receive game state data (e.g., an EGM event message) from EGM server 906 and send feedback data (e.g., an analytic output message) to analytics server 908. As another example, network module 926 may receive data from and send data to inventory server 910 via inventory API 912. In some embodiments, network module 926 may packetize data (e.g., in accordance with an internal network API) received from logic module 922 and send the packetized data to other associated devices (e.g., including spectacle client device 932 or gameplay client device 946) via a network protocol (e.g., a user datagram protocol or "UDP"). The game state data received from EGM server 906 via network module 926 may be processed by logic module 922 and stored as game state data 924 (e.g., in a database). In some embodiments, game state data 924 may be authoritative and any change to game state data 924 may trigger sending a message indicative of the change to associated devices (e.g., including spectacle client device 932 or gameplay client device 946). Network module 926 may also send the prize-related data (e.g., a prize request or a prize information request) to prize module 928. Prize module 928 may send the prize-related data to inventory server 910 via prize API 914 (e.g., for inventory server 910 to update the prize inventory).

Data streamer 902, inventory server 910, and game server 916 may be provided at the same physical locations 930 (e.g., a casino) or they may be distributed across different locations and/or supported online. Physical location 930 includes one or more spectacle client devices 932 and one or more gameplay client devices 946. Spectacle client devices 932 and gameplay client devices 946 may be communicatively coupled to game server 916 via network module 926.

Gameplay client device 946 may host a secondary game (e.g., a car racing game) or other electronic game. By way of example, gameplay client device 946 may be implemented as a tablet computer, a smart screen, or any other peripheral device mounted on a physical supporting device (e.g., a bracket attached on an end of a gooseneck) that is connected to EGM 904 directly or indirectly. Each gameplay client device 946 may include a network module 948, a processor 950, and a visual module 952. Network module 948 may receive game state data (e.g., data representing a player's in-game action) of a primary game (e.g., a slot game hosted by EGM 904) from network module 926 of game server 916 and send game state data (e.g., an in-game event notification or updated game state data) of a secondary game (e.g., the car racing game hosted at gameplay client device 946) or other electronic game to network module 926. In some embodiments, the game state data of a primary game may be used for hosting a secondary game, as described herein. As an example, game server 916 may update game state data 924 based on received in-game event data (e.g., data representing a spin action at EGM 904 if EGM 904 is a slot machine) of a primary game and transmit the in-game event data to gameplay client device 946 as a factor to determine a game state (e.g., scores or progression) of a secondary game. Processor 950 may be associated with network module 948. Processor 950 may receive the game state data of the primary game from network module 948, perform computer-readable instructions for hosting the secondary game, generate the game state data of the secondary game, and transmit the game state data of the secondary game to network module 948. Processor 950 may also transmit data (e.g., including the game state data of the secondary game and other data) to visual module 952. Visual module 952 may provide a gameplay user interface 958 for a player to play the secondary game.

As illustrated in FIG. 9, processor 950 may maintain a player index 954 (e.g., in memory or a database). Player index 954 may represent a list of players that participate in a secondary game or other electronic game. For example, the list of players represented by player index 954 may be a set of players who play a primary game at one or more electronic gaming machines (e.g., at EGMs 904). Processor 950 may also receive the game state data of the primary game from network module 948 and create and store local game state data 956 (e.g., in a memory or database). Local game state data 956 may be the same or similar to the game state data of the primary game. In some embodiments, processor 950 may override local game state data 956 with newly received game state data of the primary game.

Spectacle client device 932 may determine and display a cutscene associated with an electronic game, such as a primary game or a secondary game. Each spectacle client device 932 may include a network module 934, a processor 936, and a visual module 938. Network module 934 may receive, for instance, at least one of the game state data of a primary game (e.g., a slot game hosted by EGM 904) or the game state data (e.g., an in-game event notification or updated game state data) of a secondary game (e.g., the car racing game hosted at gameplay client device 946) from network module 926 of game server 916. For example, the game state data of the secondary game received by network module 934 may represent a score update, an in-game event (e.g., application of a powerup), starting or ending of the secondary game, or any other in-game game state change of the secondary game. In some embodiments, network module 934 may un-packetize the received data (e.g., in accordance with a network protocol) and send the un-packetized data to processor 936. In some embodiments, as illustrated in FIG. 9, network module 934 may receive data from network module 926 and may not transmit data back to network module 926. In some embodiments, as not illustrated in FIG. 9, network module 934 may receive data from network module 926 and transmit feedback data back to network module 926. The feedback data (e.g., a machine identifier of spectacle client device 932) may be informational and not be used to affect any game state of the game hosted at gameplay client device 946.

Processor 936 may be associated with network module 934. As an example, processor 936 may receive at least one of the game state data of a primary game or the game state data of a secondary game from network module 934 and determine an event associated with the secondary game based on the received game state data. Processor 936 may also transmit data (e.g., including data related to the cutscene) to visual module 938. Visual module 938 may control the display of the cutscene. Visual module 938 may be associated with a cutscene module 944 for controlling displaying the cutscene and updating the cutscene queue (e.g., store in a component associated with cutscene module 944).

As illustrated in FIG. 9, processor 936 may maintain a player focus list 940 (e.g., in a memory or database). Player focus list 940 may represent a list of participating players of a game, such as a secondary game. For any event, if its involved players are not in player focus list 940, such an event may be ignored by processor 936 for processing, and no cutscene associated with such an event may be displayed. For example, the list of participating players represented by player focus list 940 may be a leading racer or an overtaking racer if the secondary game is a car racing game. In some embodiments, player focus list 940 may be implemented as a list of player indices (e.g., integers). In some embodiments, player focus list 940 may be configured in accordance with different determined events. For example, if the event is an overtaking event of a car racing game, player focus list 940 may include an index of a player who overtakes one or more other players and a list of indices of players being overtaken. As another example, if the event is a powerup application event, player focus list 940 may include an index of a player who applies the powerup and a list of indices of players against whom the powerup is applied. It should be noted that, the usage of player focus list for controlling the display of a cutscene is optional. In other words, spectacle client device 932 may determine a cutscene for displaying without taking player focus list 940 into account.

As an example, processor 936 may receive game state data of a primary game or game state data of a secondary game from network module 934 and create and store local game state data 942 (e.g., in a memory or database). For example, local game state data 942 may be a duplicate of the game state data of the secondary game. In some embodiments, processor 936 may override local game state data 942 with newly received game state data of the secondary game. In some embodiments, processor 936 may decode or decipher the game state data received from network module 934 for updating local game state data 942 such that local game state data 942 may be synchronized with part or all of game state data 924. In some embodiments, if processor 936 determines that local game state data 942 is changed compared with its previous version after processor 936 overrides local game state data 942 with newly received game state data, processor 936 may trigger an action to be performed by visual module 938 (e.g., by sending data representing the triggered action to visual module 938). If the triggered action includes displaying a cutscene, visual module 938 may pass the triggered action to cutscene module 944.

Figure 10:
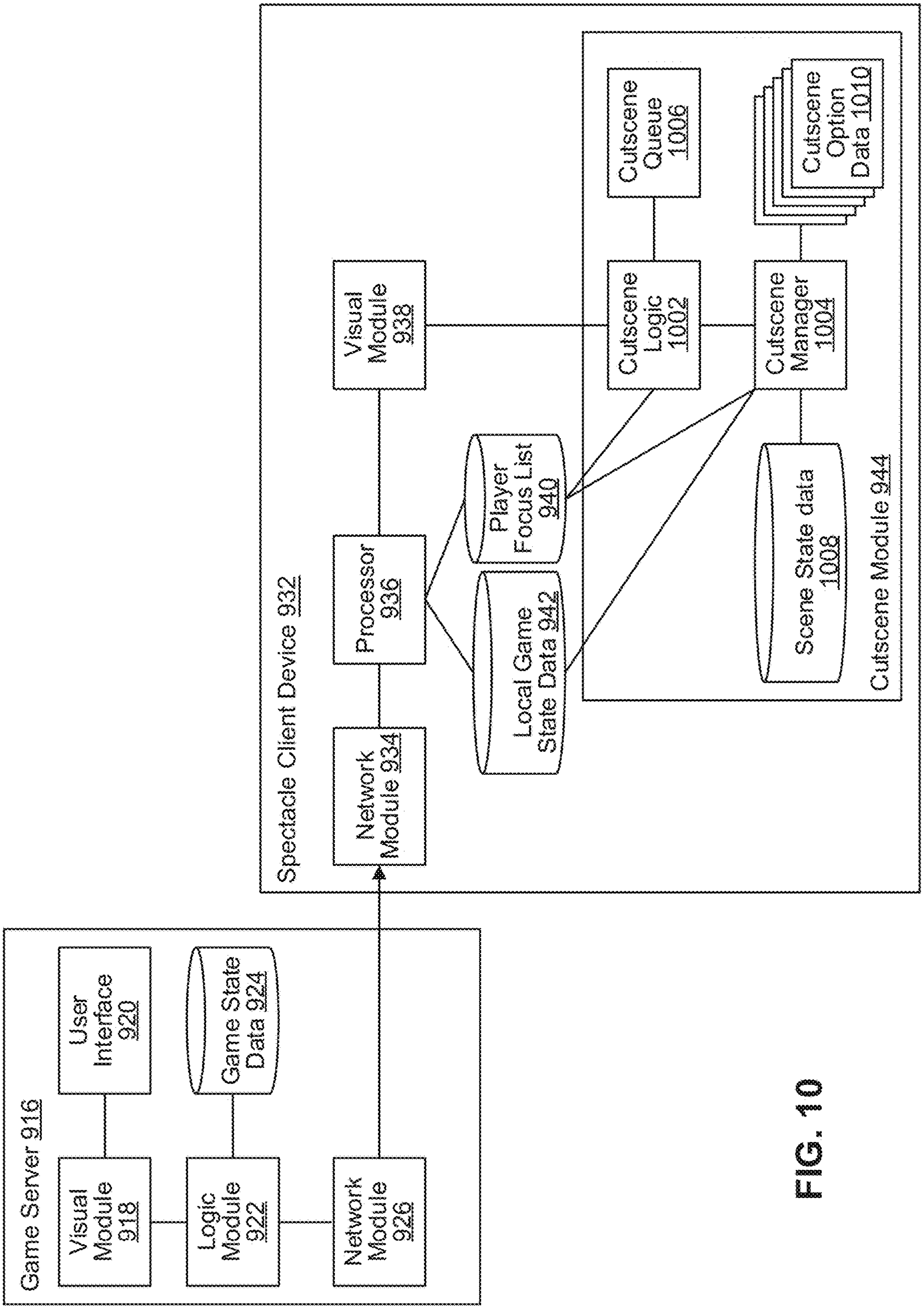
FIG. 10 illustrates an example game server and a spectacle client device for cutscene management in an electronically displayed game, consistent with embodiments of this disclosure.

By way of example, FIG. 10 is a diagram illustrating game server 916 and each spectacle client device 932, consistent with embodiments of this disclosure. It should be noted that FIG. 10 is for illustration purposes only and implementations of game server 916 and spectacle client device 932 are not limited to the example described in association with FIG. 10. For example, the number and arrangement of components in FIG. 10 may be modified or adjusted depending on the application or needs of the system. Further, each component or module in FIG. 10 may be implemented with software, firmware, hardware, or any combination thereof. Further, each block in FIG. 10 may be combined with one or more other blocks in FIG. 10 or may be divided into multiple sub-blocks, not limited to the example embodiment shown in FIG. 10.

As illustrated in FIG. 10, game server 916 includes visual module 918 that provides user interface 920, logic module 922 that stores game state data 924, and network module 926, which are described in association with FIG. 9 and will not be repeated hereinafter. Each spectacle client device 932 may include network module 934, processor 936 that maintains player focus list 940 and create and store local game state data 942, and visual module 938, which are described in association with FIG. 9 and will not be repeated hereinafter.

As illustrated in FIG. 10, cutscene module 944 is communicatively coupled to player focus list 940, local game state data 942, and visual module 938. Cutscene module 944 includes a cutscene logic 1002 and a cutscene manager 1004. Cutscene logic 1002 may be communicatively coupled to player focus list 940 and maintain a cutscene queue 1006 that includes one or more ordered cutscenes to be displayed. In some embodiments, cutscene logic 1002 may determine (e.g., based on player focus list 940) the order of the one or more cutscenes in cutscene queue 1006, the types of the one or more cutscenes in cutscene queue 1006, and the timings for displaying the one or more cutscenes in cutscene queue 1006. For example, cutscene logic 1002 may receive data from visual module 938 representing a triggered action that includes displaying a cutscene associated with an event (e.g., determined by processor 936) in a secondary game (e.g., hosted by gameplay client device 946 as described in association with FIG. 9), determine a cutscene based on the event, insert the cutscene into cutscene queue 1006, generate instructions or commands for displaying the cutscene, and send the instructions or commands to cutscene manager 1004.

In some embodiments, cutscene queue 1006 may include one or more cutscene lists. Each cutscene list may include cutscenes of the same type. The cutscene lists may be of at least one type of an attraction mode (e.g., a carousel), awaiting players, introductive carousel reveal, introductive player reveal, concluding ("outro") player reveal, concluding winner podium, a static cutaway view, driving, overtaking, biome changing, powerup (e.g., for boosting, freezing, shielding, or blocking) applied, powerup successfully applied, or powerup not successfully applied. In some embodiments, cutscene manager 1004 may select any one of the cutscenes from a cutscene list if the cutscene type is determined.

By way of example, to determine a cutscene to play, cutscene logic 1002 may receive the event determined by processor 936 from visual module 938 and access player focus list 940 and determine the cutscene based on the received event and player focus list 940. Cutscene logic 1002 may identify all possible cutscene options that may be displayed corresponding to the event. For example, if the event is "driving," cutscene logic 1002 may determine a cutscene list of driving cutscenes first, then determine one of the driving scenes as the one to be displayed. As another example, if the event is "driving in rural areas," cutscene logic 1002 may determine a cutscene list of driving cutscenes and a cutscene list of biome changing, then determine one of the scenes as the one to be displayed.

In some embodiments, if cutscene logic 1002 determines multiple cutscenes from cutscene queue 1006 as corresponding to the event, cutscene logic 1002 may further determine a particular one for displaying. For example, cutscene logic 1002 may require that the particular cutscene must be displayed in a current biome. If that still yields multiple matching cutscene, cutscene logic 1002 may further require that the particular cutscene must never been displayed. Such selection process may be repeated with more limitations until a single cutscene is selected for display.

Cutscene manager 1004 may be communicatively coupled to cutscene logic 1002, player focus list 940, and local game state data 942. In some embodiments, cutscene manager 1004 may execute instructions or commands (e.g., those received from cutscene logic 1002) to display each cutscene in cutscene queue 1006 in an order (e.g., from the first to the last) on a screen (e.g., a television screen, a display monitor, etc. not shown in FIG. 10). In some embodiments, when cutscene manager 1004 completes playing a first cutscene, cutscene logic 1002 may send instructions for cutscene manager 1004 to play a second cutscene. The second cutscene may be the cutscene following the first cutscene in cutscene queue 1006 or a random cutscene if the first cutscene is the last cutscene in cutscene queue 1006. Cutscene manager 1004 may access scene state data 1008 (e.g., stored in a memory or database) for determining at least one of a type of the cutscene or objects in the cutscene to be displayed. For example, if the game is a car racing game, scene state data 1008 may include data representing a location of the track (e.g., in a rural area or in a beach area) and one or more animated cars on the track. Cutscene manager 1004 may also access cutscene option data 1010 (e.g., stored in a memory or database) for determining options (e.g., a visual effect, an audio effect, or a tactile effect such as a vibration) for displaying the cutscene.

As an example, if one or more cars pass a waypoint or a milestone, cutscene manager 1004 may access scene state data 1008 to determine a matching location (e.g., switching from a rural area to a beach area) and access cutscene option data 1010 to determine matching visual effects for such location change, and display the cutscene with the matching location and the matching visual effects. In another example, cutscene manager 1004 may further access player focus list 940 to determine one or more focused players (e.g., the top 5 leading racers), and only display cutscenes associated with the one or more focused players.

In some embodiments, cutscene option data 1010 may include metadata for displaying a cutscene. For example, the metadata may include data representing at least one of whether a cutscene option is selected and applied, a set of parameters of the cutscene (e.g., a play speed or a timeline), a list of locations allowing the cutscene to be displayed, a set of special effect parameters (e.g., a parameter indicative of whether the player is frozen by a powerup) that controls the display of in-game players (e.g., cars), a priority list of indices of players indicative of more focus in the cutscene, or a set of parameters for setting up one or more cameras as perspectives of the cutscene. For example, if the list of locations allowing the cutscene to be displayed includes a sweeping corner, cutscene manager 1004 may display up to six cars at the sweeping corner. If the list of locations allowing the cutscene to be displayed includes a straight track, cutscene manager 1004 may display up to twelve cars at the straight track. As another example, if the list of locations allowing the cutscene to be displayed includes a starting line for starting a race, cutscene manager 1004 may display a starting grid and a banner at the starting line. In some embodiments, there may be parameters and/or other metadata associated with locations, such as parameters that specify the number and type of cutscenes or objects for a location.

Metadata may be stored and transmitted as commands or pseudo-codes. In Table 2 below, example commands are provided for implementing metadata for displaying a cutscene.

TABLE 2

```
public class SC_VisualCutsceneOption : MonoBehaviour
{
[Header("Status")]
public bool IsCurrentlyPlaying = false;
public SC_VisualCutsceneLocator CurrentStartLocator = null;
public string CurrentBiome;
public CutsceneCasting Currentcasting;
public float Cooldown = 0.0f;
[Header("Setup")]
public PlayableDirector OurPD;
public SC_VisualCutsceneLogic OurLogic;
public List<string> AllowedLocatorTypes;
public Transform WorldSpaceLocator;
public Transform CurrentVFXPlaybackSpeed;
public VisualStatusEffectRule NameTagRule =
VisualStatusEffectRule.ForceOn;
public VisualStatusEffectRule FrozenRule =
VisualStatusEffectRule. Inherit;
public VisualStatusEffectRule ShieldRule =
VisualStatusEffectRule. Inherit;
public VisualStatusEffectRule JackpotRule =
VisualStatusEffectRule. Inherit;
[Header("Roles")]
public List<string> CarRolesOptionalAhead;
public List<string> CarRolesRequiredFocus;
public List<string> CarRolesOptionalBehind;
[Header("Cameras")]
public List<CinemachineVCData> CinemachineCams;
```

In Table 2, the parameter group "Status" may include runtime parameters of the cutscene option representing selected and displayed cutscenes. The parameter group "Setup" may represent parameters defining the cutscene and referencing to other in-game objects of a game (e.g., a timeline of animations). The parameter "AllowedLocatorTypes" under the parameter group "Setup" may represent a list of locations where the cutscene is allowed to occur. For example, for a cutscene in which cars turn around a tight corner, the parameter "AllowedLocatorTypes" may represent a tight corner as a part of a track where the cars run. The parameters "NameTagRule," "FrozenRule," "ShieldRule," and "JackpotRule" under the parameter group "Setup" may be used to control a manner a car being displayed in a cutscene, such as switching on or off a special effect when the cutscene is being played. For example, when a car becomes frozen (e.g., as a result of an applied powerup), the "FrozenRule" may be switched on to turn on a freezing special effect on the frozen car to be visually displayed. The parameters "CarRolesOptionalAhead," "CarRolesRequiredFocus," and "CarRolesOptionalBehind" under the parameter group "Roles" may represent importance levels of respective cars. For example, the parameter "CarRolesRequiredFocus" may include a list of cars to have most focus and screen time in the animation. The parameter "CinemachineCams" under the parameter group "Cameras" may represent a camera set up, the camera representing a perspective of presenting the cutscene. It should be noted that the above examples are provided for purposes of illustration and that other implementations of metadata are possible and not limited to the examples in Table 2

Consistent with embodiments of this disclosure, with reference to FIGS. 9-10, EGM server 906, analytics server 908, inventory API 912, prize API 914, network module 926, prize module 928, network module 934, and network module 948 may communicate data (e.g., by packetizing the data, communicating the packetized data, and un-packetizing the received data) between each other using a network protocol. By way of example, game server 916 may generate a first network message and send it to spectacle client device 932 in accordance with the network protocol for updating local game state data 942 and performing one or more other actions (e.g., determining and displaying a cutscene). For example, the first network message may include data representing starting of the secondary game, ending of the secondary game, a list of participating players of the secondary game, a game state of the secondary game, or any other data related to the secondary game. In another example, example, game server 916 may generate a second network message and send it to gameplay client device 946 in accordance with the network protocol for updating the game state of the secondary game. For example, the second network message may include data representing an in-game event of the primary game. Based on the second network message, visual module 952 may update gameplay user interface 958 (e.g., by updating display of a leaderboard, or play a prompted audio recording).

As an example, if the secondary game hosted by gameplay client device 946 is a car racing game, and if network module 926 receives from network module 948 data representing an overtaking event (e.g., a first car overtaking a second car on a track) in the secondary game, game server 916 (e.g., logic module 922) may determine the overtaking player to score points (e.g., 1000 points). Game server 916 may also determine that such a point update meets a criterion (e.g., scoring at least 500 points) and further determine to send (e.g., via network module 926) data representing the point update to spectacle client device 932. Game server 916 may generate the first network message in accordance with the network protocol (e.g., a UDP) and broadcast the first network message to other spectacle client devices (e.g., including spectacle client device 932). Note that the first network message does not include data representing occurrence of the overtaking event, but data representing a change of points of the overtaking player. After receiving the first network message by network module 934, processor 936 of spectacle client device 932 may update local game state data 942 based on the first message and determine whether a point ranking of the participating players of the secondary game changes. If processor 936 determines that, after updating local game state data 942, the point ranking of the participating players changes, processor 936 may further determine that an overtaking event occurs. Processor 936 may then generate and send data representing the overtaking event to visual module 938, which may further send such data to cutscene module 944 for displaying a cutscene associated with the overtaking event.

As another example, if the secondary game hosted by gameplay client device 946 is a car racing game, and if network module 926 receives from network module 948 data representing a countdown event (e.g., before the start of the racing) in the secondary game, game server 916 (e.g., logic module 922) may determine that there are sufficient players (e.g., exceeding a threshold number) joining the secondary game and sufficient time has elapsed (e.g., exceeding a threshold time duration) to start the countdown event. Game server 916 may also determine that such a countdown event meets a criterion (e.g., forming a game state change) and further send (e.g., via network module 926) data representing the countdown event to spectacle client device 932. Game server 916 may generate the first network message in accordance with the network protocol (e.g., a UDP) and broadcast the first network message to other spectacle client devices (e.g., including spectacle client device 932). In some embodiments, the first network message does not include data representing occurrence of the countdown event, but data representing a change of a game state (e.g., from "awaiting" to "countdown"). For example, the game state may be represented by a numeric value (e.g., "0" for "awaiting minimum players," "1" for "awaiting more players," or "2" for "countdown"), a textual value (e.g., a text of "awaiting" or "countdown"), an alphanumeric value, a symbol value, or any form of computer-readable value. After receiving the first network message by network module 934, processor 936 of spectacle client device 932 may update local game state data 942 based on the first message and determine whether a countdown event of the secondary game occurs. If processor 936 determines that, after updating local game state data 942, the game state of the secondary game changes, processor 936 may further determine that the countdown event occurs. Processor 936 may then generate and send data representing the countdown event to visual module 938, which may further send such data to cutscene module 944 for displaying a cutscene associated with the countdown event.

Consistent with some embodiments of this disclosure, with reference to FIGS. 9-10, cutscene module 944 may determine a cutscene to be displayed without relying on local game state data 942 or player focus list 940. In some embodiments, if cutscene manager 1004 has displayed the last cutscene in cutscene queue 1006, cutscene logic 1002 may send instructions to cutscene manager 1004 for displaying a random cutscene to prevent the screen from blackout. For example, the random cutscene may be randomly selected from a set of pre-rendered cutscenes. In some embodiments, the random cutscene may be unrelated to the event associated with the secondary game. In some embodiments, the random cutscene may be a cutscene that has been previously displayed by the spectacle client device. For example, if the secondary game is a car racing game, the random cutscene may be randomly selected from a set of cutscenes including a driving cutscene of a player or a prize cutscene of an offer. In some embodiments, if the secondary game is in a game state of "awaiting players," cutscene logic 1002 may insert a cutscene of a leader board into the front of cutscene queue 1006 for cutscene manager 1004 to display for attracting more players to join the secondary game. In some embodiments, if the secondary game is ongoing, cutscene logic 1002 may insert a driving cutscene of a player into the front of cutscene queue 1006 for cutscene manager 1004 to display, in which the driving cutscene of the player is not associated with any game state change. In some embodiments, cutscene logic 1002 may detect a change in the biome of the secondary game then determine a cutscene representing such a change of biome.

Consistent with embodiments of this disclosure, with reference to FIGS. 9-10, processor 936 may monitor local game state data 942 to determine a current game state and send data representing the current game state to visual module 938 that may further send such data to cutscene module 944. Based on the current game state, cutscene logic 1002 may determine a cutscene to display or update display settings of the cutscene to reflect the current game state. For example, if the secondary game is a car racing game, a player may be determined to be "frozen" (e.g., as a result of a powerup applied against the player) as a current game state. In such an example, if cutscene manager 1004 is displaying a cutscene including the frozen player, cutscene logic 1002 may update the cutscene to display the frozen player as being enclosed in an ice shell for the duration of the cutscene until the frozen state is lifted.

By way of example, with reference to FIGS. 9-10, processor 936 may determine an event based on game state data of the secondary game (e.g., a car racing game) or other electronic game received from network module 934, cutscene logic 1002 may determine a cutscene based on the event as described herein. For example, if the event represents that a challenge is issued by a first player to a second player, the game state data of the secondary game may include a first game state indicator (e.g., a textual value "NewGameInitiated"). Based on the first game state indicator, cutscene logic 1002 may determine a first cutscene (e.g., a pre-game cutscene that await players) and insert the first cutscene into cutscene queue 1006 for cutscene manager 1004 to display.

In another example, if the event represents that the second player accepts the challenge issued by the first player and a countdown starts, the game state data of the secondary game may include a second game state indicator (e.g., a textual value "CountdownBegin"). Based on the second game state indicator, cutscene logic 1002 may determine a second cutscene (e.g., a cutscene showing a carousel prizes on offer or players lining up) and insert the second cutscene into cutscene queue 1006 for cutscene manager 1004 to display.

In another example, if the event represents that a car race starts, the game state data of the secondary game may include a third game state indicator (e.g., a textual value "RaceStarted"). Based on the third game state indicator, cutscene logic 1002 may determine no cutscene for cutscene manager 1004 to display.

In another example, if the event represents that the car race finishes, the game state data of the secondary game may include a fourth game state indicator (e.g., a textual value "RaceFinished"). Based on the fourth game state indicator, cutscene logic 1002 may determine a fourth cutscene (e.g., a cutscene showing racers crossing a finishing line in their finishing order or winners taking their places on a podium) and insert the fourth cutscene into cutscene queue 1006 for cutscene manager 1004 to display.

In another example, if the event represents that the first player overtakes the second player, the game state data of the secondary game may include a fifth game state indicator (e.g., a textual value "Overtake"). Based on the fifth game state indicator, cutscene logic 1002 may determine a fifth cutscene (e.g., a cutscene showing the first player overtaking the second player) and insert the fifth cutscene into cutscene queue 1006 for cutscene manager 1004 to display.

In another example, if the event represents that the first player successfully applies a powerup (e.g., freezing the second player), the game state data of the secondary game may include a sixth game state indicator (e.g., a textual value "PowerupUsed"). Based on the sixth game state indicator, cutscene logic 1002 may determine a sixth cutscene (e.g., a cutscene showing the first player applying the powerup or another player being affected by the powerup) and insert the sixth cutscene into cutscene queue 1006 for cutscene manager 1004 to display.

In another example, if the event represents that the first player unsuccessfully applies the powerup (e.g., failing to freeze the second player), the game state data of the secondary game may include a seventh game state indicator (e.g., a textual value "PowerupFailed"). Based on the seventh game state indicator, cutscene logic 1002 may determine no cutscene for cutscene manager 1004 to display.

In another example, if the event represents that the first player enters a jackpot mode, the game state data of the secondary game may include an eighth game state indicator (e.g., a textual value "Jackpot"). Based on the eighth game state indicator, cutscene logic 1002 may determine an eighth cutscene (e.g., a cutscene showing the first player entering the jackpot mode) and insert the eighth cutscene into cutscene queue 1006 for cutscene manager 1004 to display.

Consistent with some embodiments of this disclosure, with reference to FIGS. 7-10, to display a cutscene, cutscene manager 1004 may perform one or more casting operations. For instance, assuming the secondary game is a car racing game, cutscene manager 1004 may determine at least one of a timeline of animations for multiple cars and cameras, metadata representing importance levels (e.g., represented by the parameter group "Roles" as described in association with Table 2) of the cars to the cutscene, metadata representing a location where the cutscene occurs, or other data representing additional information (e.g., name tags). In some embodiments, cutscene manager 1004 may first determine the location where the cutscene occurs. For example, each biome and each location may be assigned with respective locator identifiers (e.g., represented by the parameter "AllowedLocatorTypes" as described in association with Table 2). Cutscene manager 1004 may compare the locator identifiers between a current biome (e.g., a rural area) and a list of locations and determine a location that has a matching locator identifier (e.g., a text string "TripleHill") with the current biome as the location where the cutscene occurs. In some embodiments, if there are more than one locations that have the matching locator identifier with the current biome, cutscene manager 1004 may randomly select one from them. After determining the location where the cutscene occurs, in some embodiments, cutscene manager 1004 may then determine an animation for each car in the cutscene based on nature of the cutscene and a ranking of the cars.

Figure 11:
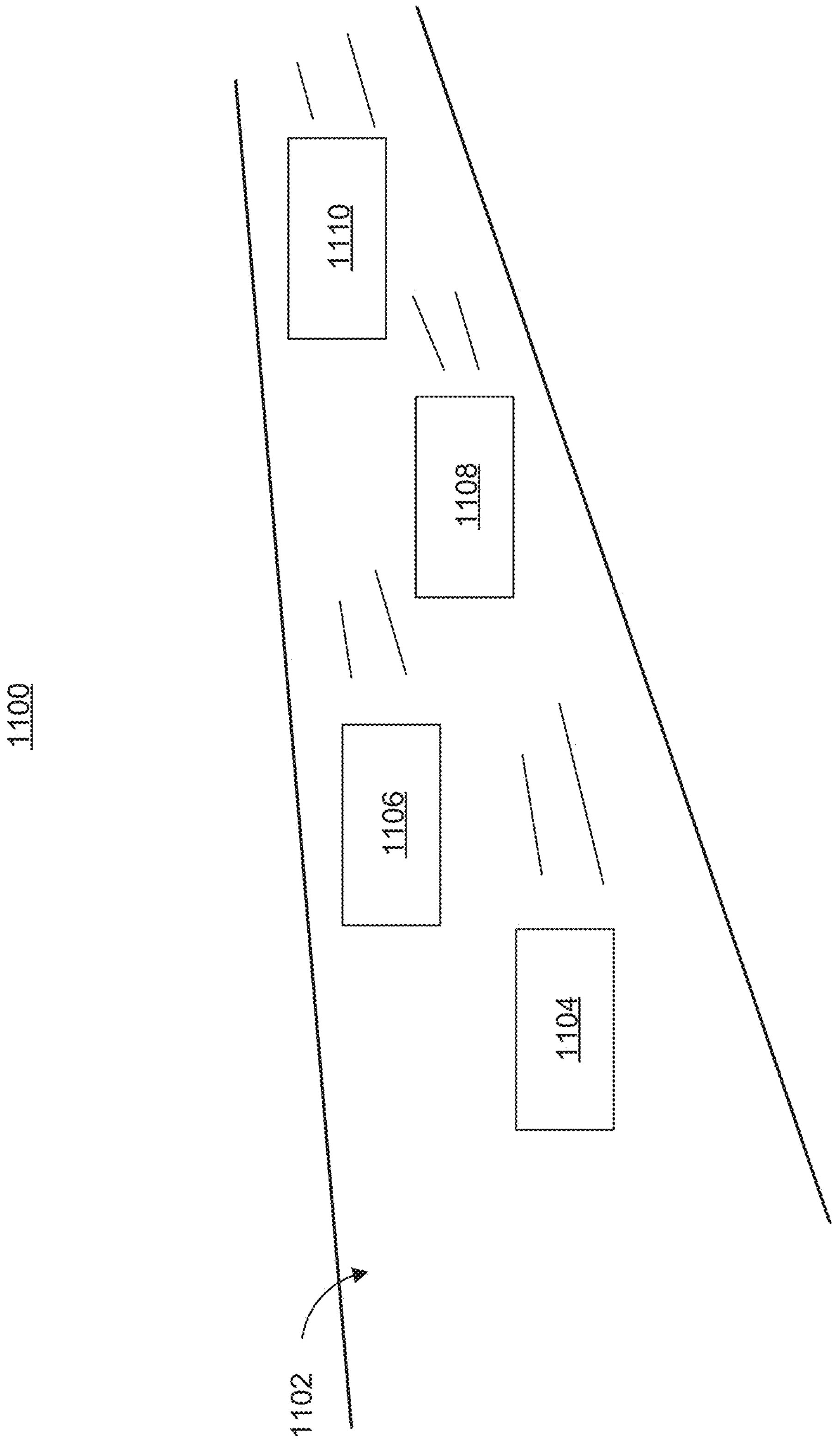
FIG. 11 illustrates an example cutscene in an electronically displayed game, consistent with embodiments of this disclosure.

By way of example, FIG. 11 is a diagram illustrating an example cutscene 1100 in an electronically displayed game, consistent with embodiments of this disclosure. The game may be a secondary game (e.g., a car racing game) or other electronic game, as described herein. As illustrated in FIG. 11, cutscene 1100 includes a track 1102 where cars run on, including cars 1104, 1106, 1108, and 1110. In cutscene 1100, cars 1104, 1106, 1108, and 1110 are in the first place, the second place, the third place, and the fourth place, respectively. Each of cars 1104, 1106, 1108, and 1110 may have an animation associated with its current position driving down track 1102. As an example, metadata of cutscene 1100 may indicate that cars 1106 and 1108 have higher importance levels (e.g., represented by the "CarRolesRequiredFocus" parameter as described in association with Table 2) than cars 1104 and 1110. Based on their importance levels, a camera of cutscene 1100 may focus on cars 1106 and 1108 than on cars 1104 and 1110.

It should be noted that cars 1104, 1106, 1108, and 1110 are not corresponding to all participating players of the secondary game of FIG. 11 in a one-to-one relationship. For example, the participating players may be represented as an ordered index list [0,5,1,2,6,11] (e.g., a ranking or their real-time racing positions), in which six players are represented by indices 0, 1, 2, 5, 6, and 11. Cutscene manager 1004 may ensure that when establishing mapping relationships from players 0, 1, 2, 5, 6, and 11 to cars 1104, 1106, 1108, and 1110 in cutscene 1100, the player ranking [0,5,1,2,6,11] may be maintained and represented. In some embodiments, cutscene manager 1004 may permit that one or more of cars 1104, 1106, 1108, and 1110 may be mapped to none of players 0, 1, 2, 5, 6, and 11. For example, if player 11 is mapped to car C, car D would be mapped to none of players 0, 1, 2, 5, 6, and 11 because there is no player behind player 11 in accordance with the player ranking [0,5,1,2,6,11].

In some embodiments, if at least one of cars 1104, 1106, 1108, and 1110 is assigned with a high importance level (e.g., exceeding a threshold value), cutscene manager 1004 may minimize the number of important cars mapped to no player or even disallow the important cars to be mapped to no player. For example, if cars 1106 and 1108 have higher importance level than cars 1104 and 1110, cutscene manager 1004 may disallow mapping player 11 to car 1106 because that would force car 1108 to be mapped to no player given there is no player behind player 11 in accordance with the player ranking [0,5,1,2,6,11].

In the above example, there are five possible mapping scenarios A to E. There scenarios are shown below in Table 3.

TABLE 3

| | | | | |
|---|---|---|---|---|
| A | Car 1104↔ [Vacant] | Car 1106↔0 | Car 1108↔5 | Car 1110↔1 |
| B | Car 1104↔0 | Car 1106↔5 | Car 1108↔1 | Car 1110↔2 |
| C | Car 1104↔5 | Car 1106↔1 | Car 1108↔2 | Car 1110↔6 |
| D | Car 1104↔1 | Car 1106↔2 | Car 1108↔6 | Car 1110↔11 |
| E | Car 1104↔2 | Car 1106↔6 | Car 1108↔11 | Car 1110↔ [Vacant] |

In Table 3, symbol "↔" represents a mapping relationship. As illustrated in Table 3, neither car 1106 nor car 1108 is mapped to no player. For mapped cars and players, all five mapping scenarios are in accordance with the player ranking [0,5,1,2,6,11]. Cutscene manager 1004 may select any of the mapping scenarios in Table 3.

In some embodiments, with reference to FIGS. 7-11, to display a cutscene, cutscene manager 1004 may perform further casting operations besides establishing the mapping relationships, such as described in association with FIG. 11. For example, cutscene manager 1004 may access player focus list 940 (see FIG. 10) and determine the mapping scenario based on both Table 3 and player focus list 940. As an example, if player focus list 940 includes all players 0, 1, 2, 5, 6, and 11, cutscene manager 1004 may select any of mapping scenarios B, C, or D because they map the maximum number (i.e., four) of players to the cars. In another example, if player focus list 940 includes only player 11, cutscene manager 1004 may select mapping scenario E because it is the only mapping scenario that maps player 11 to one of car 1106 or 1108 that has higher important levels. In another example, if player focus list 940 includes players 0, 1, and 2, cutscene manager 1004 may select mapping scenario C because it is the only mapping scenario that maps player a maximum number of players 0, 1, and 2 to cars 1106 and 1108 that has higher important levels.

Figure 12:
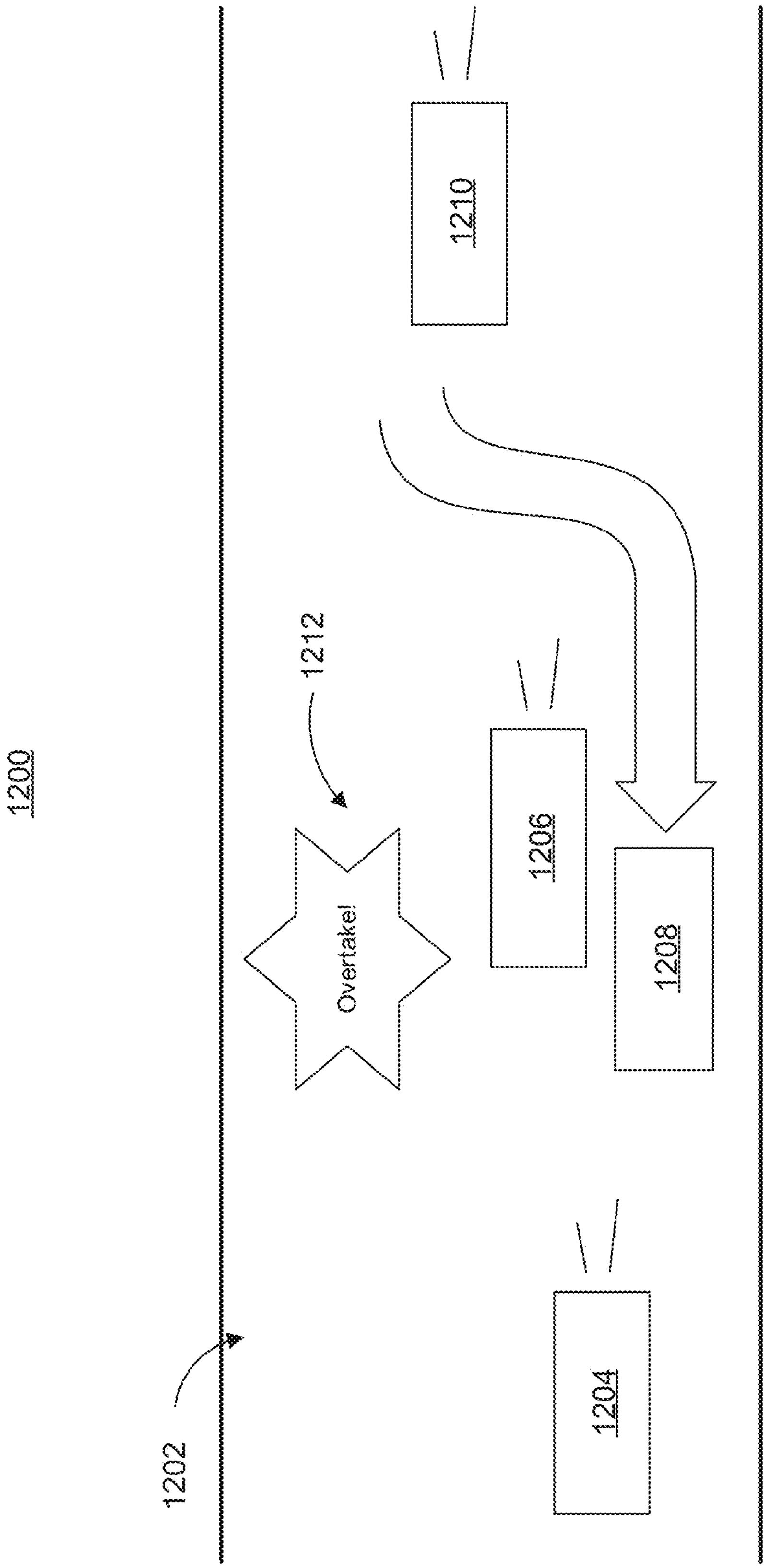
FIG. 12 illustrates another example cutscene in an electronically displayed game, consistent with embodiments of this disclosure.

By way of example, FIG. 12 is a diagram illustrating another example cutscene 1200 in an electronically displayed game, consistent with embodiments of this disclosure. The game may be a secondary game (e.g., a car racing game) or other electronic game, as described herein. As illustrated in FIG. 12, cutscene 1200 includes a track 1202 where cars run on, including cars 1204, 1206, 1208, and 1210. In cutscene 1200, cars 1204, 1206, 1208, and 1210 are originally in the first place, the second place, the third place, and the fourth place, respectively, but car 1208 is overtaking car 1206 to become the second place. Each of cars 1204, 1206, 1208, and 1210 may have an animation associated with its current position driving down track 1202. For example, as car 1208 is overtaking car 1206, an animation 1212 may be displayed near cars 1206 and 1208 to present that an overtaking event is occurring.

Assuming that, corresponding to the overtaking event as shown in FIG. 12, the player ranking changes from [0,1,2,6,5,11] to [0,5,1,2,6,11]. That is, player 5 overtakes players 6, 2, and 1, and reach the second place in the race. It should be noted that player 5 overtakes three players, but car 1208 only overtakes one car. To present the real-time player ranking and maintain the mapping relationships between the cars and players, in some embodiments, cutscene manager 1004 may select a mapping scenario where car 1204 ↔0, car 1206 ↔1, car 1208 ↔5, and car 1210 ↔2.

Consistent with embodiments of this disclosure, to display a cutscene, cutscene manager 1004 may utilize a timeline system (e.g., a timeline system of UNITY®). For example, the timeline system may collate multiple tracks of animations, effects, and scripting calls, then play them in parallel. In some embodiments, cutscene manager 1004 may dynamically associate the tracks in the timeline system (e.g., tracks of cars and tracks of animations) for reproducing the same animation with different objects (e.g., cars). For example, after determining a mapping scenario between the cars and the players (e.g., any of the mapping scenarios described in association with Table 3 and FIGS. 11-12), cutscene manager 1004 may dynamically associate each player that is mapped to a particular car with an animation track of the particular car.

In some embodiments, cutscene logic 1002 may monitor the display of the cutscene. For example, cutscene logic 1002 may periodically send an inquiry message to cutscene manager 1004 for inquiring whether cutscene manager 1004 is playing a cutscene. If tracks of the timeline system are playing, cutscene manager 1004 may send a confirmation message to indicate that it is playing a cutscene. Otherwise, cutscene manager 1004 may send a return message to indicate that it is not playing any cutscene. In some embodiments, cutscene logic 1002 may send instructions to cutscene manager 1004 to interrupt displaying of a cutscene.

Figure 13:
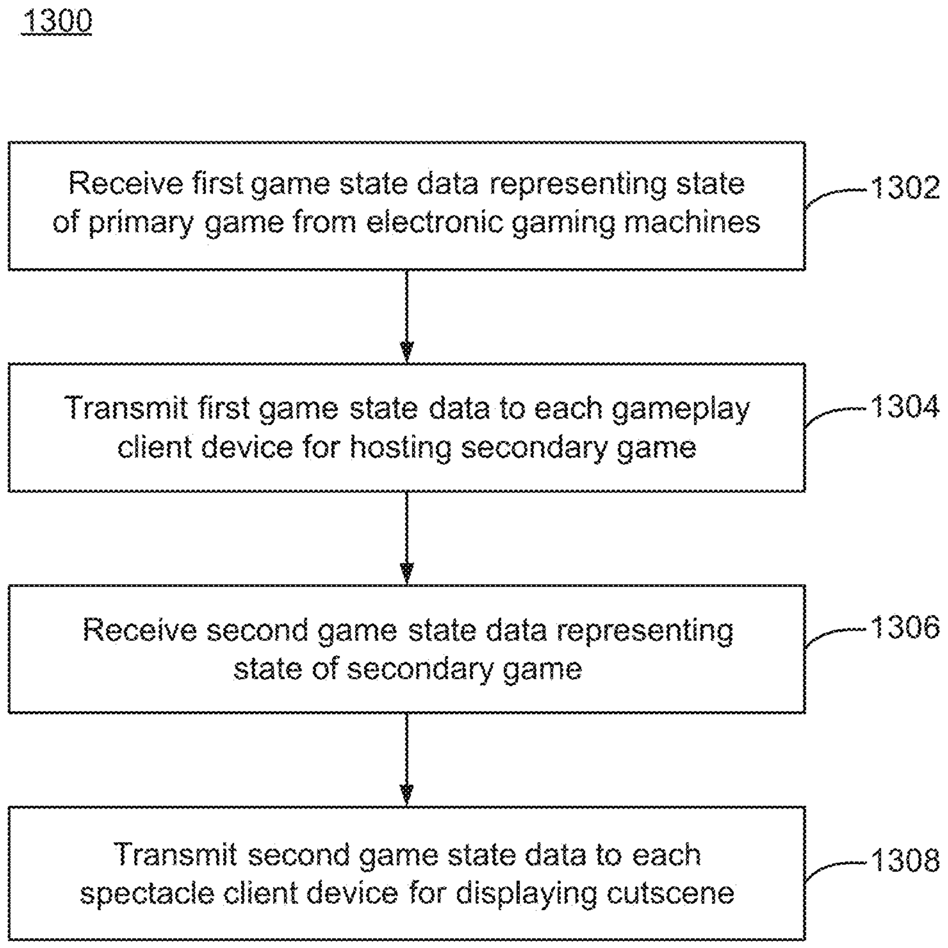
FIG. 13 illustrates a flowchart for an example method for cutscene management in an electronically displayed game, consistent with embodiments of the disclosure.

By way of example, FIG. 13 illustrates a flowchart for an example method 1300 for cutscene management in an electronically displayed game, consistent with embodiments of the disclosure. Method 1300 may be implemented by an apparatus that includes a processor and a non-transitory computer-readable medium (e.g., a memory). The non-transitory computer-readable medium may store instructions that are executable by the processor. For example, the processor may be processor 604 in FIG. 6, and the non-transitory computer-readable medium may be main memory 606 in FIG. 6. By way of example, the apparatus associated with method 1300 may be implemented as game server 916 in FIGS. 9-10.

At step 1302, the processor may receive (e.g., from data streamer 902 in FIG. 9) first game state data representing a state of a primary game (e.g., a game hosted by EGM 904) from a plurality of electronic gaming machines (e.g., including EGM 904). Each electronic gaming machine may be configured for hosting the primary game. In some embodiments, at least two of the plurality of electronic gaming machines are configured for hosting different primary games (e.g., a slot game and a blackjack game).

By way of example, the first game state data may include data representing at least one of a score associated with a player in the primary game, a result associated with the player in the primary game, a rank associated with the player in the primary game, a progression associated with the player in the primary game, a position associated with the player in the primary game, a status associated with the player in the primary game, or a game result history associated with the player in the primary game.

At step 1304, the processor may transmit the first game state data to each gameplay client device (e.g., gameplay client device 946 in FIG. 9) for hosting a secondary game (e.g., a car racing game). In some embodiments, the gameplay client device may be a first gameplay client device, and the processor may further send the first game state data to a second gameplay client device for hosting the secondary game.

At step 1306, the processor may receive (e.g., from each gameplay client device 946 in FIG. 9) second game state data representing a state of the secondary game. By way of example, the second game state data may include data representing at least one of a score associated with the player in the secondary game, a result associated with the player in the secondary game, a rank associated with the player in the secondary game, a progression associated with the player in the secondary game, a position associated with the player in the secondary game, a status associated with the player in the secondary game, or a game result history associated with the player in the secondary game.

At step 1308, the processor may transmit the second game state date to each spectacle client device (e.g., spectacle client device 932 in FIG. 9) for displaying a cutscene (e.g., cutscene 1100 in FIG. 11 or cutscene 1200 in FIG. 12).

Consistent with some embodiments of this disclosure, besides steps 1302-1308, the processor may further receive message data from the spectacle client device. The message data may include at least one of a request for game state update or identification data (e.g., a machine identifier or a MAC address) of the spectacle client device.

Figure 14:
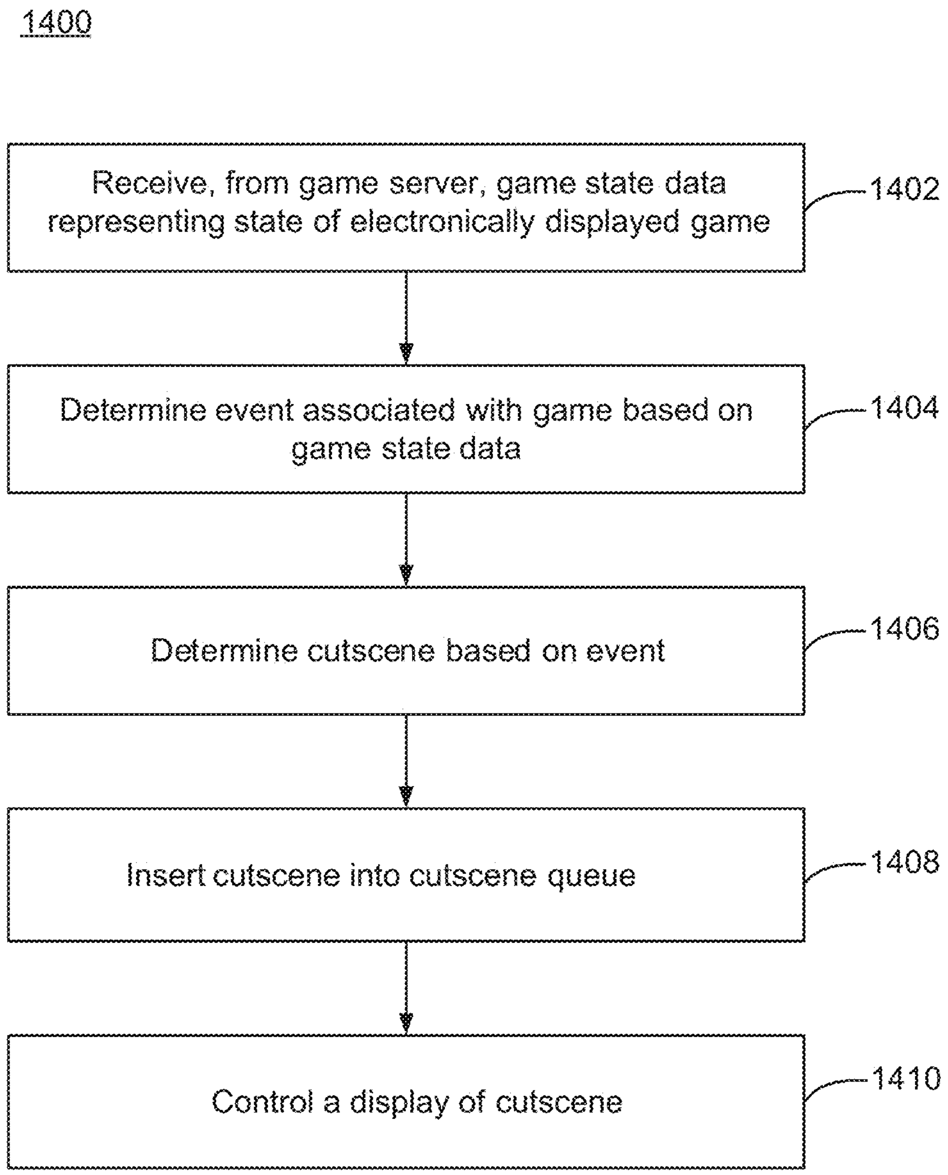
FIG. 14 illustrates a flowchart for another example method for cutscene management in an electronically displayed game, consistent with embodiments of the disclosure.

By way of example, FIG. 14 illustrates a flowchart for another example method 1400 for cutscene management in an electronically displayed game, consistent with embodiments of the disclosure. Method 1400 may be implemented by an apparatus that includes a processor and a non-transitory computer-readable medium (e.g., a memory). The non-transitory computer-readable medium may store instructions that are executable by the processor. For example, the processor may be processor 604 in FIG. 6, and the non-transitory computer-readable medium may be main memory 606 in FIG. 6. By way of example, the apparatus associated with method 1400 may be implemented as spectacle client device 932 in FIGS. 9-10.

At step 1402, the processor may receive, from a game server (e.g., game server 916 in FIGS. 9-10), game state data representing a state of an electronically displayed game. For example, the game may be a secondary game or other electronic game hosted by a gameplay client device (e.g., gameplay client device 946 in FIG. 9). In embodiments where the game is a secondary game, the secondary game may be hosted by the gameplay client device based on first game state data representing a state of a primary game (e.g., a slot game). The first game data may be received from one or more electronic gaming machines (e.g., EGM 904). The primary game may be hosted by each electronic gaming machine, as disclosed herein.

At step 1404, the processor may determine an event (e.g., an overtaking event) associated with the game based on the received game state data. By way of example, the event may include at least one of a game state change in a primary game, initiation of a secondary game, invitation to play a secondary game, acceptance of invitation to play a secondary game, generation of a player list of a secondary game, a countdown to start a secondary game, starting of a secondary game, a game state change in a secondary game, a game action by a player in a secondary game, failure of a game action by a player in a secondary game, a countdown to complete a secondary game, or completion of a secondary game. The above examples of events have been provided for primary and secondary games. It will be appreciated that similar events may exist for other electronic games (i.e., non-primary and non-secondary games).

At step 1406, the processor may determine a cutscene (e.g., cutscene 1100 in FIG. 11 or cutscene 1200 in FIG. 12) based on the event. The cutscene may be a visual representation of the event. In some embodiments, as part of steps 1404 and 1406, the processor may determine a cutscene based on a context (e.g., an event and/or biome) determined from the received game state data, as disclosed above.

At step 1408, the processor may insert the determined cutscene into a cutscene queue. The cutscene queue may include at least one cutscene associated with the game (e.g., a secondary game displayed on spectacle client device). The at least one cutscene associated with the secondary game and may be displayed in an order. In some embodiments, to insert the cutscene into the cutscene queue, the processor may determine a weight value associated with the event (or context) and determine a position of the cutscene in the cutscene queue based on the weight value.

In some embodiments, the cutscene may be a first cutscene. In such cases, after controlling displaying the first cutscene, the processor may remove the first cutscene from the cutscene queue and display a second cutscene. The second cutscene may follow the first cutscene in the cutscene queue.

In some embodiments, to display the second cutscene, the processor may determine a lifetime associated with the second cutscene. The lifetime may start to time when the second cutscene is inserted into the cutscene queue. In response to the lifetime lapsing before completion of controlling displaying the first cutscene, the processor may remove the second cutscene from the cutscene queue.

In some embodiments, to determine the cutscene based on the event, the processor may determine a cutscene type based on the event and select the cutscene from a list of predetermined cutscenes associated with the cutscene type. Further, in some embodiments, the processor may determine a cutscene type based on a context (e.g., an event and/or biome) determined from the received game state data, as disclosed above.

At step 1410, the processor may control displaying the cutscene. In some embodiments, to control displaying the cutscene, the processor may control displaying a location associated with the cutscene type and the event (or context). The processor may further control displaying an object in the location and a name associated with the object. The cutscene may include the location, the object, and the name. In some embodiments, the cutscene may be a first cutscene. As part of step 1410 or as another step, the processor may determine a change of the location, determine a second cutscene based on the change of the location, and control displaying the second cutscene.

In some embodiments, to control displaying the cutscene, the processor may determine a time duration for the cutscene. The processor may further control displaying the cutscene for the time duration.

Consistent with some embodiments of this disclosure, besides steps 1402-1410, in response to receiving the game state data from the game server, the processor may further determine whether a difference exists between the game state data and local game state data (e.g., local game state data 942 in FIG. 9) associated with the state of the secondary game. The local game state data may be stored in the spectacle client device (e.g., in a database). Also, the processor may update the local game state data using the game state data based on a determination that the difference exists between the game state data and the local game state data. In some embodiments, to determine the event associated with the secondary game based on the game state data, the processor may determine the event based on the difference.

Consistent with some embodiments of this disclosure, besides steps 1402-1410, the processor may further control displaying a random cutscene in response to the cutscene queue being empty after controlling displaying the cutscene.

Consistent with some embodiments of this disclosure, the cutscene may be a first cutscene. Besides steps 1402-1410, the processor may further determine a transition event in the first cutscene, determine a second cutscene based on the transition event, and control displaying the second cutscene. By way of example, the transition event may represent at least one of a game action by a player in a secondary game, failure of a game action by a player in a secondary game, or a game state change associated with a player in a secondary game.

Although the systems, devices, and methods described above uses a primary game and a secondary game as examples for ease of explanation, it should be noted that this disclosure is not limited so. For example, the spectacle client device may perform the methods of cutscene management described herein for any electronic game (i.e., not limited to a primary game or a secondary game, as described herein) and associated game state data (i.e., not limited to first game state data or second game state data, as described herein).

Embodiment of the present disclosure may be implemented through any suitable combination of hardware, software, or firmware. Modules and components of the present disclosure may be implemented with programmable instructions implemented by a hardware processor. In some embodiments, a non-transitory computer-readable storage medium including instructions is also provided, and the instructions may be executed by a processor device for performing the above-described steps and methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, or a memory. Examples of networks for supporting the herein described connections and communication of data feeds and information include private and public networks, including intranets, local area networks, and wide area networks (including the Internet). Such networks may include any combination of wired and wireless networks and support associated communication protocols.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, firmware, or software, or any combination of hardware, firmware, and software. One of ordinary skill in the art will also understand that multiple ones of the above-described modules/units may be combined as one module/unit, and each of the above-described modules/units may be further divided into a plurality of sub-modules/sub-units. For example, there may be a single physical computer for the administrator server, the matching server, and other components.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A computer-implemented gaming system, comprising:

a plurality of gameplay client devices communicatively coupled to a game server, each gameplay client device including at least one processor configured to:

host an electronically displayed game; and transmit game state data representing a state of the game to the game server while the game is ongoing, wherein the game server is configured to further transmit the game state data; and a spectacle client device for providing an observer view of the game while the game is ongoing and being communicatively coupled to the game server, the spectacle client device comprising:

at least one processor being configured to:

receive the game state data representing a state of the game from the game server in real-time;

create and store, on the spectacle client device, local game state data; and determine an event associated with the game based on the local game state data; and a cutscene module configured to:

determine at least one cutscene associated with the game based on the event, the at least one cutscene including a visual representation of the event;

insert the at least one cutscene into a cutscene queue, the cutscene queue comprising the at least one cutscene associated with the game and a sequence for displaying the at least one cutscene during the game; and implement a trigger action based on the event and cause an update of the observer view to show the at least one cutscene from the cutscene queue during the game.

2. The gaming system of claim 1, further comprising a plurality of electronic gaming machines communicatively coupled to the game server, each electronic gaming machine being configured to host a primary game and transmit first game state data to the game server representing a state of the primary game, wherein the game server is configured to further transmit the first game state data.

3. The gaming system of claim 2, wherein the plurality of gameplay client devices include a first gameplay client device and a second gameplay client device, the second gameplay client device including at least one processor configured to receive the first game state data from the game server and host a secondary game based on the first game state data, wherein the secondary game is different from the primary game.

4. The gaming system of claim 3, wherein the first game state data comprises data representing at least one of a score associated with a player in the primary game, a result associated with the player in the primary game, a rank associated with the player in the primary game, a progression associated with the player in the primary game, a position associated with the player in the primary game, a status associated with the player in the primary game, or a game result history associated with the player in the primary game.

5. The gaming system of claim 4, wherein the at least one processor of the second gameplay client device is further configured to transmit second game state data representing a state of the secondary game to the game server, the second game state data comprises data representing at least one of a score associated with a player in the secondary game, a result associated with the player in the secondary game, a rank associated with the player in the secondary game, a progression associated with the player in the secondary game, a position associated with the player in the secondary game, a status associated with the player in the secondary game, or a game result history associated with the player in the secondary game.

6. The gaming system of claim 1, wherein the event comprises at least one of a game state change in the game, initiation of the game, invitation to play the game, acceptance of invitation to play the game, generation of a player list of the game, a countdown to start the game, starting of the game, a game state change in the game, a game action by a player in the game, failure of a game action by a player in the game, a countdown to complete the game, or completion of the game.

7. The gaming system of claim 1, wherein the at least one processor of the spectacle client device is further configured to:

determine whether a difference exists between additional game state data received from the game server and existing local game state data associated with the state of the game, wherein the existing local game state data is stored in the spectacle client device; and based on a determination that the difference exists between the additional game state data received from the game server and the existing local game state data, update the existing local game state data using the additional game state data received from the game server.

8. The gaming system of claim 1, wherein the at least one cutscene is a first cutscene, the cutscene queue further includes a second cutscene, and the cutscene module of the spectacle client device is further configured to:

remove the first cutscene from the cutscene queue after the first cutscene is displayed; and control a display of the second cutscene, wherein the second cutscene follows the first cutscene in the cutscene queue.

9. The gaming system of claim 8, wherein the cutscene module of the spectacle client device is further configured to:

determine a lifetime associated with the second cutscene, wherein the lifetime starts to time when the second cutscene is inserted into the cutscene queue; and in response to the lifetime lapsing before displaying the second cutscene, remove the second cutscene from the cutscene queue.

10. The gaming system of claim 1, wherein the cutscene module of the spectacle client device is further configured to:

in response to the cutscene queue being empty after displaying the at least one cutscene, cause a random cutscene to be displayed.

11. The gaming system of claim 1, wherein the at least one cutscene is a first cutscene, the cutscene queue further includes a second cutscene, and wherein:

the at least one processor of the spectacle client device is further configured to determine a transition event in the first cutscene; and the cutscene module is further configured to:

determine the second cutscene based on the transition event; and control a display of the second cutscene.

12. The gaming system of claim 11, wherein the transition event represents at least one of a game action by a player in the game, failure of the game action by the player in the game, or a game state change associated with the player in the game.

13. The gaming system of claim 1, wherein the at least one processor of the spectacle client device is further configured to:

transmit message data to the game server, the message data including at least one of a request for game state update or identification data of the spectacle client device.

14. The gaming system of claim 1, wherein the cutscene module of the spectacle client device is further configured to:

determine a cutscene type based on the event; and select the at least one cutscene from a list of predetermined cutscenes associated with the cutscene type.

15. The gaming system of claim 1, wherein the cutscene module of the spectacle client device is further configured to:

determine a weight value associated with the event; and determine a position of the at least one cutscene in the cutscene queue based on the weight value.

16. The gaming system of claim 1, wherein the cutscene module of the spectacle client device is further configured to:

determine a location associated with the cutscene type and the event; and control a display of an object in the location and a name associated with the object, wherein the cutscene comprises the location, the object, and the name.

17. The gaming system of claim 16, wherein the at least one cutscene is a first cutscene, the cutscene queue includes a second cutscene, and the cutscene module of the spectacle client device is further configured to:

determine a change of the location;

determine a second cutscene based on the change of the location; and control a display of the second cutscene.

18. The gaming system of claim 1, wherein the cutscene module of the spectacle client device is further configured to:

determine a time duration for the at least one cutscene; and control a display of the at least one cutscene for the time duration.

19. The gaming system of claim 1, wherein the cutscene module of the spectacle client device is further configured to implement cutscene logic to maintain the cutscene sequence, and a cutscene manager communicatively coupled to the cutscene logic and configured to display the at least one cutscene.

20. The gaming system of claim 19, wherein the cutscene logic is further configured to generate an insertion request, the insertion request comprising one or more commands and data representing at least one of a cutscene type, a biome, a time duration of the cutscene being in the cutscene queue, a lifetime associated with the cutscene, a weight value associated with the cutscene, or event-specific information of the cutscene.

21. The gaming system of claim 20, wherein the cutscene manager is further configured to receive the insertion request and display the at least one cutscene in accordance with the insertion request.

22. The gaming system of claim 19, wherein the cutscene manager is further configured to apply metadata for identifying options for displaying the at least one cutscene, the metadata comprising at least one of whether a cutscene option is selected and applied, a set of parameters of the cutscene, a list of locations allowing the cutscene to be displayed, a set of special effect parameters controlling the display of in-game players, a priority list of indices of players indicative of focuses in the at least one cutscene, or a set of parameters for setting up one or more cameras as perspectives of the cutscene.

23. A computer-implemented method for cutscene management, the method comprising the following steps performed by a spectacle client device for providing an observer view of an electronically displayed game while the game is ongoing:

receiving, from a game server in real-time while the game is ongoing, game state data representing a state of the electronically displayed game, the game being hosted by a plurality of gameplay client devices;

creating and storing, on a local memory storage on the spectacle client device and separate from the game server, local game state data;

determining, using the at least one processor, an event associated with the game based on the local game state data;

determining, using a cutscene module on the spectacle client device, at least one cutscene based on the event, the at least one cutscene including a visual representation of the event;

inserting, using the cutscene module, the at least one cutscene into a cutscene queue, the cutscene queue comprising at least one cutscene associated with the game and a sequence for displaying the at least one cutscene during the game; and implementing, using the cutscene module, a trigger action and causing an update of the observer view to show the at least one cutscene from the cutscene queue during the game.

24. The computer-implemented method of claim 23, wherein the game is a secondary game that is dependent on game state data associated with a primary game, the primary game being hosted by a plurality of electronic gaming machines communicatively coupled to the game server.

25. The computer-implemented method of claim 23, wherein the event comprises at least one of a game state change in the game, initiation of the game, invitation to play the game, acceptance of invitation to play the game, generation of a player list of the game, a countdown to start the game, starting of the game, a game state change in the game, a game action by a player in the game, failure of a game action by a player in the game, a countdown to complete the game, or completion of the game.

26. The computer-implemented method of claim 23, further comprising:

in response to receiving the game state data from the game server, determining whether a difference exists between additional game state data and existing local game state data stored in a spectacle client device; and based on a determination that the difference exists between the additional game state data received from the game server and the existing local game state data, updating the existing local game state data using the additional game state data received from the game server.

27. The computer-implemented method of claim 26, wherein determining the event associated with the game comprises:

determining the event based on the determined difference between the additional game state data received from the game server and the existing local game state data.

28. The computer-implemented method of claim 23, wherein the at least one cutscene is a first cutscene, the cutscene queue includes a second cutscene, and the method further comprises:

after causing the update of the displayed view to show the first cutscene, removing the first cutscene from the cutscene queue; and controlling a display of the second cutscene, wherein the second cutscene follows the first cutscene in the cutscene queue.

29. The computer-implemented method of claim 28, wherein controlling the display of the second cutscene comprises:

determining a lifetime associated with the second cutscene, wherein the lifetime starts to time when the second cutscene is inserted into the cutscene queue; and in response to the lifetime lapsing before completion of the display of the second cutscene, removing the second cutscene from the cutscene queue.

30. The computer-implemented method of claim 23, further comprising:

in response to the cutscene queue being empty after the display of the at least one cutscene, controlling a display of a random cutscene.

31. The computer-implemented method of claim 23, wherein the at least one cutscene is a first cutscene, the cutscene queue includes a second cutscene, and the method further comprises:

determining a transition event in the first cutscene;

determining the second cutscene based on the transition event; and controlling a display of the second cutscene.

32. The computer-implemented method of claim 31, wherein the transition event represents at least one of a game action by a player in the game, failure of the game action by a player in the game, or a game state change associated with a player in the game.

33. The computer-implemented method of claim 23, wherein determining the at least one cutscene based on the event comprises:

determining a cutscene type based on the event; and selecting the at least one cutscene from a list of cutscenes associated with the cutscene type.

34. The computer-implemented method of claim 23, wherein inserting the at least one cutscene into the cutscene queue comprises:

determining a weight value associated with the event; and determining a position of the at least one cutscene in the cutscene queue based on the weight value.

35. The computer-implemented method of claim 23, wherein the updating of the displayed view to show the at least one cutscene comprises:

controlling a display of a location associated with the cutscene type and the event; and controlling a display of an object in the location and a name associated with the object, wherein the at least one cutscene comprises the location, the object, and the name.

36. The computer-implemented method of claim 35, wherein the at least one cutscene is a first cutscene, the cutscene queue includes a second cutscene, and the method further comprises:

determining a change of the location;

determining the second cutscene based on the change of the location; and controlling a display of the second cutscene.

37. The computer-implemented method of claim 23, further comprising:

determining a time duration for the at least one cutscene; and controlling a display of the at least one cutscene for the time duration.

* * * * *